(12) United States Patent
Otfried Brusberg et al.

(10) Patent No.: US 10,690,858 B2
(45) Date of Patent: Jun. 23, 2020

(54) EVANESCENT OPTICAL COUPLERS EMPLOYING POLYMER-CLAD FIBERS AND TAPERED ION-EXCHANGED OPTICAL WAVEGUIDES

(71) Applicant: CORNING INCORPORATED, Corning, NY (US)

(72) Inventors: Lars Martin Otfried Brusberg, Corning, NY (US); Sergey Anatol'evich Kuchinsky, St. Petersburg (RU); Aramais Robert Zakharian, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/907,647

(22) Filed: Feb. 28, 2018

(65) Prior Publication Data

US 2019/0265416 A1    Aug. 29, 2019

(51) Int. Cl.
*G02B 6/30* (2006.01)
*G02B 6/12* (2006.01)

(52) U.S. Cl.
CPC ......... *G02B 6/305* (2013.01); *G02B 6/12016* (2013.01)

(58) Field of Classification Search
CPC .................. G02B 6/1228; G02B 6/262; G02B 2006/12195; G02B 6/4291
See application file for complete search history.

(56) References Cited

U.S. PATENT DOCUMENTS 3,873,408 A    3/1975  Hensler
3,880,630 A    4/1975  Izawa
(Continued)

FOREIGN PATENT DOCUMENTS

JP    04086607 A    3/1992
JP    2006201298 A    8/2006
(Continued)

OTHER PUBLICATIONS

Cheng et al. ("Simulation of tapered transitions in ion-exchanged channel waveguides", Applied Optics, vol. 29, No. 8, Mar. 10, 1990) (Year: 1990).*

(Continued)

*Primary Examiner* — Ellen E Kim
(74) *Attorney, Agent, or Firm* — Grant A. Gildehaus

(57) ABSTRACT

The evanescent optical coupler is constituted by an IOX waveguide and an optical fiber. The IOX waveguide is formed in a glass substrate and has a tapered section that runs in an axial direction. The IOX waveguide supports a waveguide fundamental mode having an waveguide effective index $N_{W0}$ that varies within a range $\Delta N_{W0}$ as a function of the axial direction. The IOX waveguide can also support a few higher-order modes. The optical fiber supports a fiber fundamental mode having a fiber effective index $N_{F0}$ that falls within the waveguide effective index range $\Delta N_{W0}$ of the waveguide fundamental mode of the tapered section of the IOX waveguide. A portion of the optical fiber is interfaced with the tapered section of the IOX waveguide to define a coupling region over which evanescent optical coupling occurs between the optical fiber and the IOX waveguide.

38 Claims, 13 Drawing Sheets

(56) References Cited

U.S. PATENT DOCUMENTS

| | | | |
|---|---|---|---|
| 4,765,702 | A | 8/1988 | Dohan et al. |
| 5,007,948 | A | 4/1991 | Araujo |
| 5,018,811 | A | 5/1991 | Haavisto et al. |
| 5,035,734 | A | 7/1991 | Honkanen et al. |
| 5,160,523 | A | 11/1992 | Honkanen |
| 5,703,980 | A | 12/1997 | MacElwee et al. |
| 5,790,729 | A | 8/1998 | Pologe |
| 6,002,515 | A | 12/1999 | Mizuuchi et al. |
| 6,153,546 | A | 11/2000 | Saitoh et al. |
| 6,289,027 | B1 | 9/2001 | Lawrence et al. |
| 6,611,372 | B1 | 8/2003 | Peyghambarian et al. |
| 6,768,852 | B2 | 7/2004 | Zhang |
| 6,946,416 | B2 | 9/2005 | Maxon et al. |
| 7,326,500 | B1 | 2/2008 | Glebov et al. |
| 8,230,702 | B2 | 7/2012 | Xu et al. |
| 8,737,777 | B2 | 5/2014 | Pitwon |
| 9,268,096 | B1 | 2/2016 | Krasulick et al. |
| 9,563,018 | B2 * | 2/2017 | Budd .................. G02B 6/1228 |
| 2003/0081902 | A1 * | 5/2003 | Blauvelt ............ G02B 6/12002 385/50 |
| 2003/0095771 | A1 | 5/2003 | Kim |
| 2003/0113054 | A1 * | 6/2003 | Furuyama ............ G02B 6/4214 385/14 |
| 2003/0121283 | A1 | 7/2003 | Yu |
| 2003/0144125 | A1 | 7/2003 | Anma et al. |
| 2004/0206129 | A1 | 10/2004 | Dabby |
| 2006/0260364 | A1 | 11/2006 | Pun et al. |
| 2008/0268201 | A1 | 10/2008 | Fiacco et al. |
| 2009/0324163 | A1 * | 12/2009 | Dougherty ............. B82Y 20/00 385/14 |
| 2011/0236288 | A1 | 9/2011 | Panz et al. |
| 2011/0244238 | A1 | 10/2011 | Panz et al. |
| 2013/0170802 | A1 | 7/2013 | Pitwon |
| 2013/0322813 | A1 * | 12/2013 | Grondin ................. B82Y 20/00 385/14 |
| 2014/0079620 | A1 | 3/2014 | Panz et al. |
| 2014/0092377 | A1 | 4/2014 | Liu et al. |
| 2014/0152914 | A1 | 6/2014 | King |
| 2014/0376868 | A1 | 12/2014 | Ritter et al. |
| 2015/0023631 | A1 * | 1/2015 | Shastri .................... B32B 37/16 385/14 |
| 2015/0198757 | A1 | 7/2015 | Comstock, II et al. |
| 2015/0368146 | A1 | 12/2015 | Ellison et al. |
| 2016/0018949 | A1 | 1/2016 | Lambricht et al. |
| 2016/0131837 | A1 * | 5/2016 | Mahgerefteh .......... G02B 6/124 385/14 |
| 2017/0205583 | A1 | 7/2017 | Bennett et al. |
| 2018/0067273 | A1 | 3/2018 | Geng et al. |
| 2019/0369244 | A1 * | 12/2019 | Asghari ............. H01S 5/02248 |
| 2019/0384003 | A1 * | 12/2019 | Painchaud ............... G02B 6/14 |

FOREIGN PATENT DOCUMENTS

| | | |
|---|---|---|
| KR | 100439900 B1 | 7/2004 |
| WO | 2000054197 A2 | 8/2000 |
| WO | 0137008 A2 | 5/2001 |
| WO | 03062863 A2 | 7/2003 |
| WO | 2016055006 A1 | 4/2016 |
| WO | 2017009468 A1 | 1/2017 |

OTHER PUBLICATIONS

Julich et al; "Determination of the Effective Refractive Index of Various Single Mode Fibers for Fibre Bragg Grating Sensor Applications"; Sensor+Test Conference 2009, Opto 2009 Proceedings pp. 119-124 (2009).

Oven; "Tapered Waveguides Produced by Ion Exchange in Glass with a Nonuniform Electric Field"; Journal of Lightwave Technology; vol. 24, No. 11, Nov. 2006; pp. 4337-4344.

Poulopoulos et al; "SiN-Assisted Flip-Chip Adiabatic Coupler Between SiPh and Glass OPCBS"; Proceedings of SPIE; 9753; Mar. 2016; pp. 975310-1-975310-10.

Ramaswamy et al; "Ion-Exchanged Glass Waveguides: A Review"; Journal of Lightwave Technology, vol. 6., No. 6., Jun. 1988; pp. 984-1002.

Wartak; "Simulation and Modeling: Computational Photonics Models Wavefuide-Based Optics," Laser Focus World, vol. 52, Issue 02, Feb. 2016.

Zhang et al; "Modes Effective Refractive Index Difference Measurement in a Few Mode Optical Fiber"; Procedia Engineering; 140; (2016); p. 77-84.

Mashayekhi et al. "Semiconductor device to optical fiber coupling using low-loss glasstaper waveguide" , Optical Engineering, Soc. of Photo-optical Instrumentation Engineers 36(12) 1997.

International Search Report and Written Opinion PCT/US2019/017931 dated May 6, 2019, 15 Pgs.

Almeida et al: "WaveGuides and Nonlinear Index of Refraction of Borate Glass Doped With Transistion Metals" ; Optical Materials 42 (2015) pp. 522-525.

Auxier et al; "Silver and Potassium Ion-Exchanged Waveguides in Glasses Doped With PbS Semiconductor Quantum Dots" ; J. Opt. Soc. Am. B, Vol. 23, No. 6, (2006) p. 1037-1045

Betschon et al; "Design Principles and Realization of Electro-Optical Circuit Boards," SPIE 8630 (2013); pp. 86300U-1-86300U-12

Brusberg et al; "High Performance Ion-Exvhanged Integrated Waveguides in Thin Glass for Board-Level Multimode Optical Interconnects" ; Proc ECOC (2015); 3 Pages.

Furukawa et al; "Optical Damage Resistance and Crystal Quality of LiNbO3 Single Crystals With Various [Li]/[Nb] Ratios" ; Journal of Applied Physics, 72, (8); (1992) pp. 3250-3254

Hao et al; "Single-Mode-Fiber-Matched Waveguide by Silver/Sodium Ion-Exchange and Field-Assisted Ion-Diffusion" , Optoelectronics and Advanced Materials—Rapid Communications; vol. 3; No. 9; (2009) pp. 865 - 868.

Hayden et al; "Active Materials for Integrated Optic Applications" ; SPIE vol. 3847 (1999) pp. 186-196.

Ingenhoff et al: "Minimizing Losses in Silver Ion-Exchanged Waveguides Using a Double Ion Exchange Process" ; SPIE vol. 2401; (1995) 10 Pages.

Ishigure; "Gi-Core Polymer Optical Waveguide for Triggering the Migration of Optical Interconnects From Inter-Rack to PCBs" Proc. ECOC, Tu3.5.5, (2014); 3 Pages.

Kash et al; "Optical Interconnects in Exascale Supercomputers" ; IEEE Photonics Society; (2010) pp. 483-484.

Keck et al; "Spectral Response of Low-Loss Optical Aveguides" ; Applied Optics; vol. 11 No. 7; (1972) pp. 1502-1506.

Madasamy et al; "Buried Ion-Exchanged Glass Waveguides: Burial-Depth Dependence on Waveguide Width" ; Optics Letters; vol. 28, No. 13, (2003) pp. 1132-1134.

Marcuse; "Influence of Curvature on the Losses of Doubly Clad Fibers" , Applied Optics / vol. 21, No. 23 / Dec. 1, 1982

Matoba et al; "Nonuniform and Off-Axis Structures for Photorefractive Waveguides in Lithium Niobate" ; Opt. Eng. 35 (8); (1996) pp. 2175-2181

Meany et al; "Towards Low-Loss Lightwave Circuits for Non-Classical Optics At 800 nm and 1550 nm" ; Applied Physics A, vol. 114, Issue 1; (2014) pp. 113-118.

Nakai et al; "Reduction of Absorption Loss Due to Iron Ions in Fluoride Glasses" ; Electronic Letters, vol. 21, No. 14 (1985) pp. 625-626

Olivares et al; "Fe Ions in Proton-Exchanged LiNbO3 Waveguides" ; Appl. Phys. Lett. 61, (6); (1992) pp. 624-626.

Penty et al; "Low Loss Ends for On-Board Polymer Interconnects" PhoxTroT Symposium, Berlin (2014); 25 Pages.

Pitwon et al; "Pluggable Electro-Optical Circuit Board Interconnect Based on Embedded Graded-Index Planar Glass Waveguides" ; Journal of Lightwave Technology, vol. 33, No. 4, (2015); pp. 741-754.

Ramponi et al.' "New Er-Doped Phosphate Glass for Ion-Exchange Active Waveguides: Accurate Determination of the Refractive Index" ; Optical Materials, 14 (2000) pp. 291-296.

Rehouma et al; "Glasses for Ion-Exchange Technology" ; International Journal of Communications; Issue 4, vol. 1, (2008); pp. 148-155.

(56) References Cited

OTHER PUBLICATIONS

Rogozinski; "Ion Exchange in Glass—The Changes of Glass Refraction"; Intech Chapter 7; (2012); pp. 155-190.
Sheridan et al; "Channel Waveguides in Ion-Exchanged Pyrex by Direct UV Writing"; Optics Communications, 242 (2004) pp. 109-114.
Stewart et al; "Planar Optical Waveguides Formed by Silver-Ion Migration in Glass" IEEE Journal of Quantum Electronics, vol. QE-13, No. 4; (1977); pp. 192-200.
Tanio et al; "What Is the Most Transparent Polymer?" Polymer Journal, vol. 32, No. 1 pp. 43-50 (2000).
Tervonen et al, "Ion-Exchanged Glass Waveguides Technology: A Review"; Optical Engineering, 50 (7); (2011) pp. 071107-1-071107-15.
Tick; "Are Low-Loss Glass-Ceramic Optical Waveguides Possible?"; Optics Letters; vol. 23, No. 24, (1998) pp. 1904-1905
Yliniemi et al; "Ion-Exchanged Glass Waveguides With Low Birefringence for a Broad Range of Waveguide Widths"; Applied Optics; vol. 44, No. 16 (2005) pp. 3358-3363.
Zhang et al; "Photo-Written Three-Dimensional Optical Circuits in Iron Doped Lithium Niobate Crystals", Proc. of SPIE 6149, 2nd Internaitonal Symposium on Advanced Optical Manufacturing and Testing Technologies: Advanced Optical Manufacturing Technologies; (2006) 9 Pages.

* cited by examiner

EVANESCENT OPTICAL COUPLERS EMPLOYING POLYMER-CLAD FIBERS AND TAPERED ION-EXCHANGED OPTICAL WAVEGUIDES

FIELD

The present disclosure generally relates to optical couplers used to perform optical coupling between fibers and waveguides, and more particularly relates to evanescent optical couplers that employ polymer-clad fibers and tapered ion-exchanged optical waveguides.

BACKGROUND

Optical interconnects based on ion-exchanged (IOX) waveguides realized in thin glass substrates are a promising alternative to electrical (e.g. copper), or optical-fiber-based high-density, high bit-rate, short distance (less than 1 m) links for high-performance computing and data center applications. Such IOX waveguides have the advantage of dense routing, flexibility, integration, and co-packaging with electronic integrated circuits.

A high bit-rate optical signal is typically delivered to optical interconnect waveguides through an optical fiber. Thus, a low-cost, low-loss connectivity solution from a single mode fiber to an IOX waveguide is desirable. A standard approach is to use an end-to-end coupling (also called edge coupling) between the single mode fiber and Iox waveguide. Such coupling requires that the glass edge and fiber end be processed to achieve an optical quality (i.e., smoothly polished) surface for low-loss coupling. This coupling also requires that mode sizes (i.e., mode-field diameters) of the guided mode of the fiber and the guided mode of the IOX waveguide be closely matched.

An alternative approach to end-to-end coupling is to use evanescent coupling between the fiber and the IOX waveguide. Unfortunately, efficient evanescent optical coupling between a fiber and an IOX waveguide requires that the separation as well as the alignment between the fiber and the waveguide be controlled to challenging tolerances, e.g., to micron or even sub-micron levels. While evanescent coupling does not require matching of the fiber and waveguide modes shapes, it does require matching propagation constants of the fiber and waveguide guided waves. In evanescent coupling, the optical power transfer mechanism occurs all along an interface that is typically parallel to the direction of the travel of the guided mode, as opposed to end-to-end coupling where the power transfer occurs abruptly at an interface perpendicular to the direction of travel of the guided mode.

While evanescent coupling could provide some advantages over end-to-end coupling for an optical coupler, shortcomings in the consistency of the IOX fabrication process can result in significant variations in the properties of the IOX waveguides. In addition, the tight alignment and spacing requirements between the fiber and the IOX waveguide as well as the inherent mismatch in propagation constants have presented significant obstacles in achieving an efficient evanescent optical coupler using a single mode fiber in combination with an IOX waveguide formed in glass.

SUMMARY

Aspects of the disclosure are directed to an evanescent optical coupler that employs a single mode fiber ("fiber") and an IOX waveguide. An example fiber has a D-shaped glass inner cladding, which places the core of the fiber near a flat surface of the glass inner cladding. This fiber configuration allows for the core of the close fiber and the core of the IOX waveguide to be placed close enough to one other when forming the evanescent optical coupler so that evanescent coupling can occur between the fiber and the IOX waveguide.

Standard fibers and glass IOX waveguides have a substantial mismatch in their effective refractive indices due to the smaller refractive indices of fibers versus IOX waveguides. The fiber cladding and the fiber core of the fibers used in the evanescent couplers disclosed herein are updoped to closely match the fiber effective index of the fiber fundamental mode to the nominal IOX waveguide effective index of the waveguide fundamental mode. The IOX waveguide includes a tapered section configured to provide a controlled change of the waveguide effective index for the waveguide fundamental mode around the nominal design value. The taper is configured to accommodate a variation in the effective indices of the fundamental modes of the fiber and IOX waveguide due to doping and other manufacturing variations. This allows for matching of the fiber and waveguide effective indices for the fundamental mode within the length of the tapered section to obtain efficient optical power transfer (i.e., high coupling efficiency CE) between the fiber and the IOX waveguide via evanescent coupling. The taper of the tapered section can be geometric (i.e., the IOX waveguide varies in physical size along the IOX waveguide length) or the taper can be intrinsic, i.e., a variation in the refractive index profile along the length of the IOX waveguide, or the taper can be both geometric and intrinsic.

The example tapered configurations for the IOX waveguide for the evanescent optical couplers disclosed herein provide sufficient tolerance to variations in the fiber and IOX waveguiding parameters to allow for a coupling efficiency CE≥80% or even CE≥90%.

An embodiment of the disclosure is an evanescent optical coupler, comprising: an IOX waveguide formed in a glass substrate comprising a tapered section that runs in an axial direction and that supports a waveguide fundamental mode having a waveguide effective index $N_{W0}$ that varies within a range $\Delta N_{W0}$ as a function of the axial direction; an optical fiber that supports a fiber fundamental mode having a fiber effective index $N_{F0}$ that falls within the range $\Delta N_{W0}$ of the waveguide fundamental mode of the tapered section of the IOX waveguide; and wherein a portion of the optical fiber is interfaced with the tapered section of the IOX waveguide to define a coupling region over which evanescent optical coupling occurs between the optical fiber and the IOX waveguide.

Another embodiment of the disclosure is an evanescent optical coupler, comprising: a glass substrate having a top surface; an IOX region formed in the glass substrate, wherein the IOX region and an immediately adjacent surrounding portion of the glass substrate define an IOX waveguide comprising a tapered section that runs in an axial direction and that supports optical transmission of a waveguide fundamental mode and up to six waveguide higher-order modes at an operating wavelength, wherein the waveguide fundamental mode has an effective index $N_{W0}$ that varies within an effective index range $\Delta N_{W0}$ as a function of the axial direction within the tapered section; a single mode optical fiber that supports a fundamental mode with a fiber effective index $N_{F0}$ at the operating wavelength, the optical fiber comprising a glass core with a core refractive index, a glass inner cladding with a cladding refractive index disposed about the glass core and comprises a flat surface, and wherein the glass core and the glass inner cladding are updoped so that the fiber effective index $N_{F0}$ falls within the effective index range $\Delta N_{W0}$ of the mode effective index $N_{W0}$ of the waveguide fundamental mode of the tapered section of the IOX waveguide; and wherein a portion of the flat surface of the glass inner cladding is interfaced with the tapered section of the IOX waveguide to establish evanescent optical coupling between the optical fiber and the IOX waveguide.

Another embodiment of the disclosure is a method of performing evanescent optical coupling of an optical signal at an operating wavelength, comprising: interfacing an IOX waveguide with an optical fiber to define a coupling region over which evanescent optical coupling occurs between the optical fiber and the IOX waveguide, wherein the IOX waveguide comprises a tapered section at the coupling region that supports a waveguide fundamental mode having a waveguide effective index $N_{W0}$ that varies within a waveguide effective index range $\Delta N_{W0}$ within the tapered section, and wherein the optical fiber supports a fiber fundamental mode having a fiber effective index $N_{F0}$ that falls within the waveguide effective index range $\Delta N_{W0}$ at an axial position within the tapered section and transmitting the optical signal in one of the fiber fundamental mode and the waveguide fundamental mode to cause the evanescent optical coupling of the optical signal into the other of the waveguide fundamental mode and the fiber fundamental mode in the coupling region and at the axial position where the fiber effective index $N_F$ equals the waveguide fundamental mode effective index $N_{W0}$.

Additional features and advantages will be set forth in the detailed description which follows, and, in part, will be apparent to those skilled in the art from that description or recognized by practicing the embodiments as described herein, including the detailed description which follows the claims, as well as the appended drawings.

It is to be understood that both the foregoing general description and the following detailed description are merely exemplary and are intended to provide an overview or framework to understanding the nature and character of the claims. The accompanying drawings are included to provide a further understanding, and are incorporated in and constitute a part of this specification. The drawings illustrate one or more embodiments, and together with the description explain the principles and operation of the various embodiments.

DETAILED DESCRIPTION

Figure 1A:
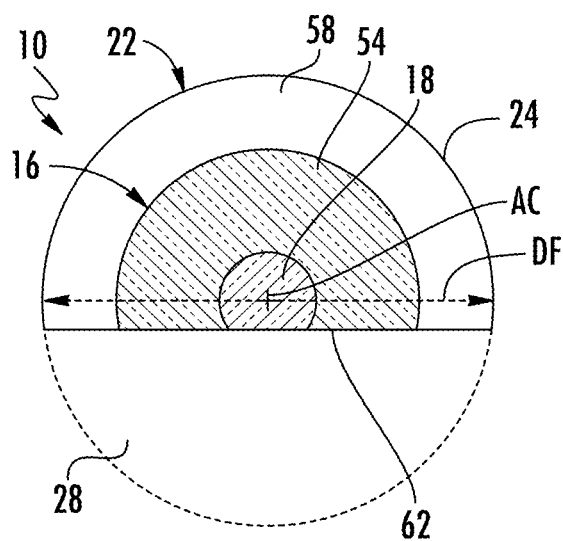
FIGS. 1A and 1B are cross-sectional views of two example polymer-clad D-shaped optical fibers ("fibers") used to form the evanescent couplers disclosed herein.

Reference will now be made in detail to the present embodiments, examples of which are illustrated in the accompanying drawings. Whenever possible, the same reference numerals will be used throughout the drawings to refer to the same or like parts.

Cartesian coordinates are used in some of the Figures for reference and are not intended to be limiting as to direction or orientation.

For purposes of description herein, the terms "upper," "lower," "right," "left," "rear," "front," "vertical," "horizontal," "top," "bottom," "side," and derivatives thereof, shall relate to the disclosure as oriented with respect to the Cartesian coordinates in the corresponding Figure, unless stated otherwise. However, it is to be understood that the disclosure may assume various alternative orientations, except where expressly specified to the contrary.

The term "mode" is short for "guided mode" or "waveguide mode," which describes an allowed spatial distribution of light that propagates in a waveguide, whether it be an optical fiber or substrate-based waveguide. A mode can have a transverse electric (TE) polarization or a transverse magnetic (TM) polarization. A single mode waveguide supports only one TE and one TM mode. Modes are identified by a mode number m, where m=0 is the fundamental mode and m=1, 2, . . . are higher-order modes.

The term "geometric taper" is used to define a taper wherein physical dimensions of a structure change as a function of distance.

The term "intrinsic taper" is used to define a change in a property of the material of the structure, and in particular a change in the refractive index profile. A given taper can be geometric along or intrinsic alone, or a combination of both geometric and intrinsic.

The parameter P is an integer and is used to denote the total number of modes supported by the IOX waveguide disclosed herein. In the most general case, $1 \leq P \leq 7$, while in other examples, $1 \leq P \leq 5$ or $1 \leq P \leq 3$.

The parameter Q is an integer and is used to denote the number of higher-order modes and is defined by Q=P−1, so that in various examples, $0 \leq Q \leq 6$ or $0 \leq Q \leq 4$ or $0 \leq Q \leq 2$.

The abbreviation "nm" stands for "nanometer," which is $1 \times 10^{-9}$ meter.

The abbreviation "pin" stands for "micron" or "micrometer," which is $1 \times 10^{-9}$ meter.

The operating wavelength λ is the wavelength at which the evanescent optical coupler as disclosed herein is configured to work, and in an example the operating wavelength is in the spectral range from 800 nm to 1600 nm, which is the standard wavelength range for telecommunication applications. In particular examples, the operating wavelength λ can be 850 nm, 1310 nm or 1550 nm.

The propagation constant is denoted while the effective index is denoted N, which is also denoted in the art as $n_{eff}$. The propagation constant and the effective index N are related to one another via the equation N=β/k, wherein k=2π/λ, and where λ is the (free space) operating wavelength. Thus, N and β differ only by a constant and so can be considered equivalent parameters.

While an effective index is a property of a guided mode, it is defined by the waveguide structure (configuration) and so can also be considered a property of the waveguide. The effective index or indices of a waveguide can be measured, e.g., by prism coupling techniques known in the art, including by using commercially available prism coupling apparatus, such as the Model 2010/M system available from Metricon Corporation, Pennington, N.J. The effective index (or effective indices) of an optical fiber can also be measured, e.g., by using a fiber Bragg grating. See, e.g., the publication by Jülich et al., "Determination of the effective refractive index of various single mode fibers for fibre Bragg grating sensor applications," SENSOR+TEST Conference 2009, OPTO 2009 Proceedings, pages 119-124 (2009) or the publication by Zhang et al, "Modes effective refractive index difference measurement in few-mode optical fiber," Procedia Engineering 140, (2016), pp. 77-84.

The effective index (or indices) of an IOX waveguide or an optical fiber can also be readily determined by computer modeling of the IOX waveguide structure or optical fiber structure using computational photonics. Here, the IOX waveguide structure or optical fiber structure means the geometry or size of the waveguide-defining components as well as the intrinsic properties such as the refractive index profile defined by the waveguide-defining components. There are several commercially available software programs that employ computational photonics to perform simulations of waveguide-based structures and that can be used to determine the effective index or effective indices supported by a given waveguide. An example software program is OptiBPM from Optiwave Systems, Inc., of Ottowa Ontario, Canada. Three other example software programs include CrystalWave and FIMMWAVE, from Photon Design of Oxford, United Kingdom, and FemSIM solver from Synopsis, Inc., Mountain View, Calif. A review of computational photonics software for waveguide simulation and modeling is provided in the article by M. Wartak, "Simulation and modeling: Computational photonics models waveguide-based optics," Laser Focus World, Vol. 52, Issue 02, February 2016.

The effective index N of a guided mode of either a planar waveguide or an optical fiber can be thought of as a measure of how much of the light in the guided mode travels within the core versus the cladding. A higher effective index N means that more light is traveling in the higher-index core, while a lower effective index N means that more light is traveling in the lower-index cladding. In the case of a geometrically tapered waveguide, the wide end will more easily contain the guided mode within the core, so that the mode will have a higher effective index N. The smaller end of the taper will tend to squeeze the guided mode so that more of the light will need to travel in the cladding, giving the mode a lower effective index N. The same is true with an intrinsic taper based on refractive index alone, wherein a greater core refractive index provides greater light-guiding ability than a smaller core refractive index, meaning that more of the guided light travels within the higher-index core of the waveguide and so has a higher effective index N than a waveguide with a lower-index core. Thus, waveguide that has a geometric taper, an intrinsic taper or a combination of both types of taper can be configured to support at least one guided mode that has an effective index N that can vary with position along the taper.

The effective index N for the IOX waveguide discussed below is denoted $N_W$ and is referred to as the waveguide effective index, and is in the range $n_0 < N_W < n_1$, where $n_1$ is the maximum refractive index of the IOX region and $n_0$ is the refractive index of the bulk glass in which the IOX waveguide is formed and that constitutes a cladding refractive index for the IOX waveguide. The propagation constant for the IOX waveguide is denoted $\beta_W$ and is referred to herein as the waveguide propagation constant. Each waveguide mode m has a waveguide effective index denoted $N_{Wm}$, so that for example the waveguide effective index for the waveguide fundamental mode is denoted $N_{W0}$. A range of the waveguide effective index is denoted generally as $\Delta N_W$, while the range for a given waveguide mode is denoted $\Delta N_{Wm}$, such as $\Delta N_{W0}$ for the range of the waveguide effective index for the waveguide fundamental mode. The waveguide effective index $N_W$ for a waveguide can vary over a range $\Delta N_W$ due to a change in the waveguiding properties of the waveguide.

The effective index N for the fiber discussed below is denoted $N_F$ and is referred to as the fiber effective index, and is in the range $n_{cl} < n_F < n_{co}$, where $n_{co}$ is the maximum refractive index of the fiber core and $n_{cl}$ is the refractive index of the glass inner cladding that immediately surrounds the fiber core. The propagation constant for the IOX waveguide is denoted $\beta_F$ and is referred to as the fiber propagation constant. The fibers discussed herein are single mode fibers so that the fiber effective index $N_{F0}$ refers to the fiber fundamental. A range of the fiber effective index for the fiber fundamental mode is denoted $\Delta N_{F0}$. The fiber effective index $N_F$ for a fiber can vary over a range $\Delta N_F$ due to a change in the waveguiding properties of the fiber.

The maximum refractive index change or refractive index contrast is denoted $\Delta n$ and is given by the difference between a maximum refractive index $n_{max}$ and a minimum refractive index $n_{min}$, i.e., $\Delta n = n_{max} - n_{min}$, which in the examples of the IOX regions and the IOX waveguides discussed below can be written as $\Delta n = n_1 - n_0$ unless otherwise noted. The refractive index contrast percent is defined as $\Delta n$ (%)=100·$\Delta n$.

The axial refractive index profile $n_T(x)$ as used herein refers to a refractive index profile of the tapered section of the IOX region as taken in the axial direction, i.e., down the length of the taper, and represents the maximum refractive index value at each y-z plane of the IOX region.

The relative refractive index is denoted $\Delta$ and is given by wherein $\Delta_i = (n_i^2 - n_{ref}^2)/(2n_i^2)$, where $n_i$ is the refractive index at a particular location "i" while $n_{ref}$ is a reference refractive index, which in the examples below is taken to be that for pure silica ($n_{ref}$=1.444 at 1550 nm) at the operating wavelength $\lambda$ unless stated otherwise.

The relative refractive index percent is denoted $\Delta_i$ (%) and is given by $\Delta_i$ (%)=100·$\Delta_i$ or $\Delta_i$ (%)=100·$(n_i^2 - n_{ref}^2)/(2n_i^2)$.

The term "updoped" refers to a doping process performed in glass wherein a dopant is added to the glass that increases the refractive index of the glass. Such a dopant is referred to herein as an "updopant."

The term "mole fraction" is denoted $\chi$ and is the number $n_a$ of moles of a component a in a material divided by the total number of moles $n_t$ in the material, i.e., $\chi = n_a/n_t$. The sum of the mole fractions of all the component that make up the material is equal to 1.

The "mole %" or "mole percent" is $\chi \cdot 100$. The sum of the mole percentages of all the components that make up the material is equal to 100%.

It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise. Additionally, embodiments depicted in the figures may not be to scale or may incorporate features of more than one embodiment.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "comprises" as used herein, such as in the phrase "A comprises B," is intended to include as a special case "A consists of B."

Example Polymer-Clad Fibers

Figure 1B:
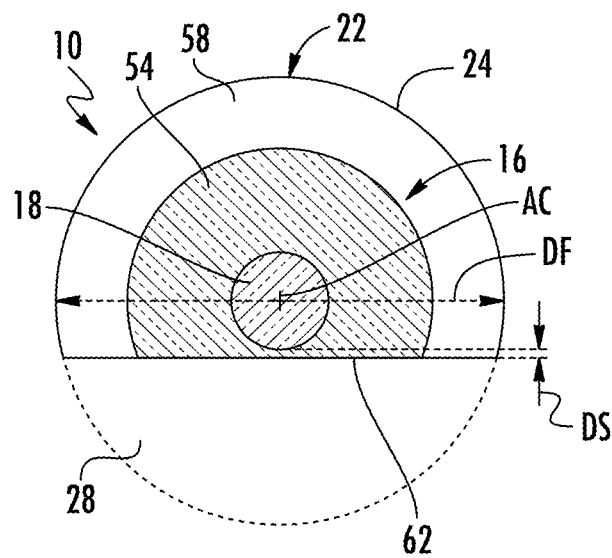

FIGS. 1A and 1B are cross-sectionals view two example polymer-clad optical fiber ("fiber") 10. The fiber 10 includes a central axis AC and has an overall diameter DF. The fiber 10 includes a glass portion 16 defined by a glass core 18 of refractive index $n_{co}$ and a glass inner cladding 54 of refractive index $n_{cl}$, where $n_{co} > n_{cl}$.

The fiber 10 is a single mode fiber. A typical single mode fiber can have a core refractive index $n_{co}$ of 1.4491 and a cladding refractive index $n_{cl}$ of 1.444 at a wavelength of 1550 nm. Thus, a typical range on the effective index $N_F$ of a conventional single mode fiber is 1.444 < $N_F$ < 1.4491. However, as discussed below, the fiber 10 disclosed herein has substantially higher core and cladding refractive indices $n_{co}$ and $n_{cl}$ obtained for example via updoping of the core and cladding glass material.

The fiber 10 includes an outer cladding 58 positioned around the glass portion 16 and in particular around the glass inner cladding 54. The outer cladding 58 is made of a polymer and so is referred to hereinafter as the polymeric outer cladding 58 to distinguish from the glass inner cladding 54. The combination of the glass core 18, the glass inner cladding 54 and the polymeric outer cladding 58 is what makes the fiber 10 a polymer-clad optical fiber.

The polymeric outer cladding 58 can be composed of two parts: an inner, softer layer and an outer harder layer. The polymeric material that makes up the polymeric outer cladding 58 may include high density acrylate, low density acrylate, polyethylene, polystyrene, polymethylmethacrylate, nylon, silicone, silicone based materials, fluorinated acrylates, polyimide, ethylene tetrafluoroethylene, fluoroacrylate, fluoromethacrylate and combinations thereof. The polymeric material may be optically transparent. The polymeric outer cladding 58 may have a diameter ranging from between about 10 μm and about 900 μm, between about 80 μm and about 250 μm or between about 100 μm and 150 μm.

The glass inner cladding 54 and the polymeric outer cladding 58 cooperate to form a cladding 22 disposed around the core 18. The fiber 10 has an outer surface 24, which can be defined either by: i) the polymeric outer cladding 58; ii) a portion of the polymeric outer cladding 58 and a portion of the glass inner cladding 54; or iii) a portion of the polymeric outer cladding 58 and a portion of the glass inner cladding 54 and a portion of the core 18.

The core 18 may be composed of pure silica, doped silica (e.g., doped with germanium, aluminum, titanium, and/or chlorine) and/or other optically transparent materials. The glass inner cladding 54 may be composed of pure silica, doped silica (e.g., fluorine, boron, and/or titanium) or other optically transparent materials. The selective doping of the core 18 and the glass inner cladding 54 used to form an evanescent coupler with suitably high coupling efficiency CE is described in greater detail below.

The glass portion 16 has a glass-portion surface 62 that can be exposed when the end section 12 of the fiber 10 is processed to remove some of the polymeric outer cladding 58 to form a stripped end portion 28. In an example, this removal process is carried out prior to drawing the fiber 10. Note that in some examples, the glass-portion surface 62 is formed by only the glass inner cladding 54 (FIG. 1B), while in other examples the glass-portion surface is formed by both the glass inner cladding and the core 18 (FIG. 1A). The glass-portion surface 62 may be flat and run parallel to the central axis AC of the fiber 10 and/or may extend coaxially with the fiber for either a portion of the fiber 10 or the entire length of the fiber. In examples, the glass inner cladding 54 along with the flat glass-portion surface 62 gives the fiber 10 a "D" shape, especially at the stripped end portion 28. In FIG. 1A, the core 18 resides at the flat glass-portion surface 62. In FIG. 1B, the core 18 resides a distance DS from the flat glass-portion surface. In general, the distance DS is in the range 0 µm≤DS≤4 µm, where the case of DS=0 is shown in FIG. 1A. Note that in the example of FIG. 1A, the flat glass-portion surface 62 can cut into an otherwise round core 18 so that the core can have a D shape and be part of the flat glass-portion surface 62. In an example, the glass core 18 is centered on the central axis.

As noted above, the fiber 10 is single mode, i.e., is configured to support only the fundamental mode at an operating wavelength λ, which in an example can be one of the known fiber telecommunication wavelengths as noted above. Since the fiber 10 is single mode, it has only a single fiber effective index $N_F$ and thus a single fiber propagation constant $\beta_F$. As discussed in greater detail below, the fiber effective index $N_F$ can fall within a range $N_F$ from a target fiber effective index value due to fiber manufacturing variations, including variations in the updoping of the fiber 10. Note that a variation in the fiber effective index $N_F$ translates into a variation in the fiber propagation constant $\beta_F$ over a corresponding range $\Delta\beta_F$.

Figure 2A:
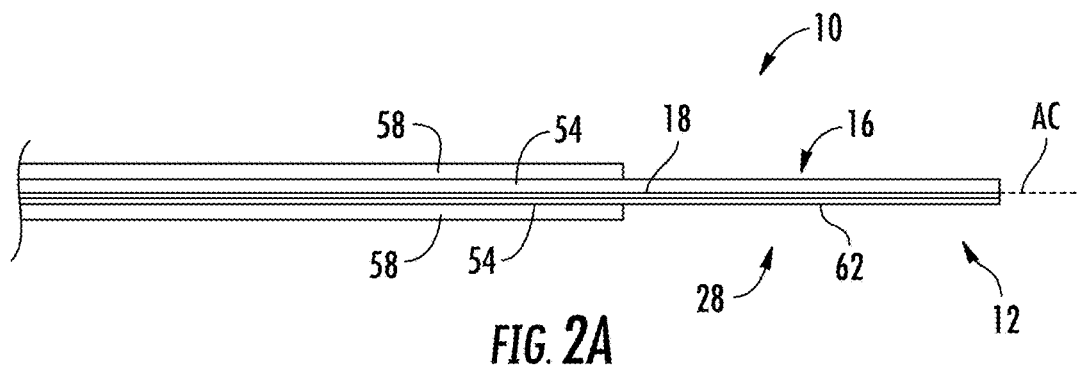
FIGS. 2A and 2B are side views of an end section of the example fiber of FIG. 1B that shows a stripped end portion of an example fiber used to form the evanescent coupler disclosed herein.
Figure 2B:
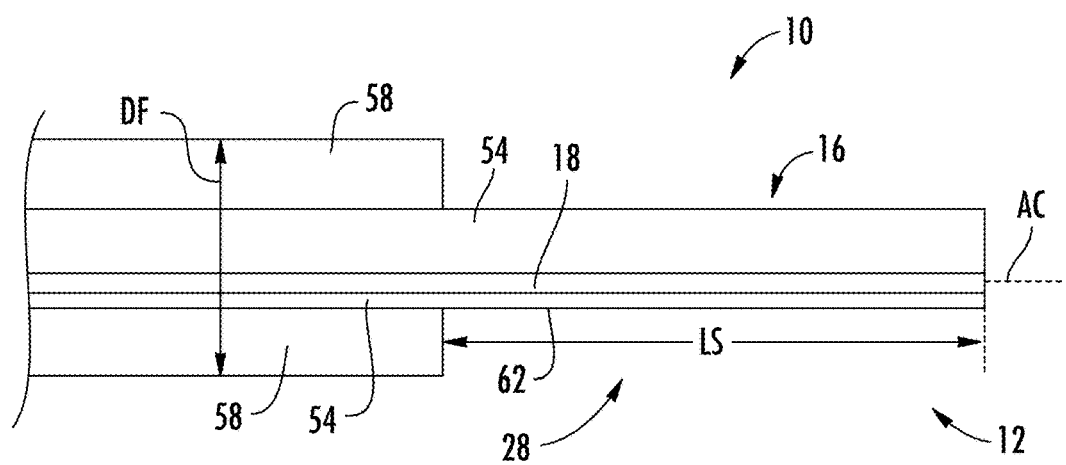
Figure 2C:
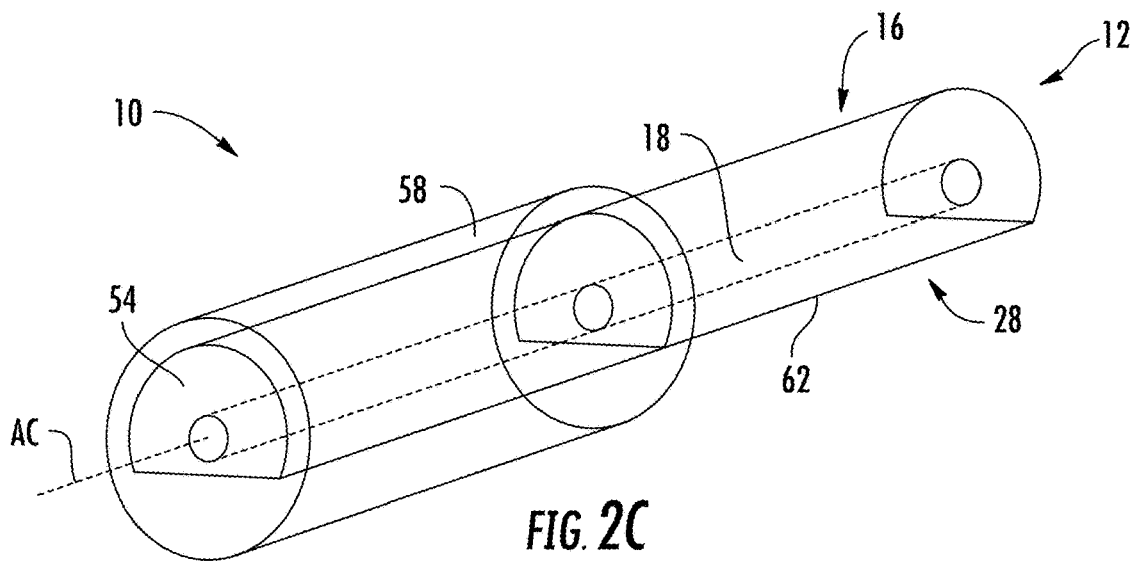
FIG. 2C is a back elevated view of the end section of the example fiber of FIGS. 2A and 2B.

FIGS. 2A and 2B are side views and FIG. 2C is a front elevated view of an end section 12 of the example fiber 10 of FIG. 1B and these Figures show the stripped end portion 28. The stripped end portion 28 has an axial length LS (FIG. 2B).

Example IOX Waveguide

Figure 3A:
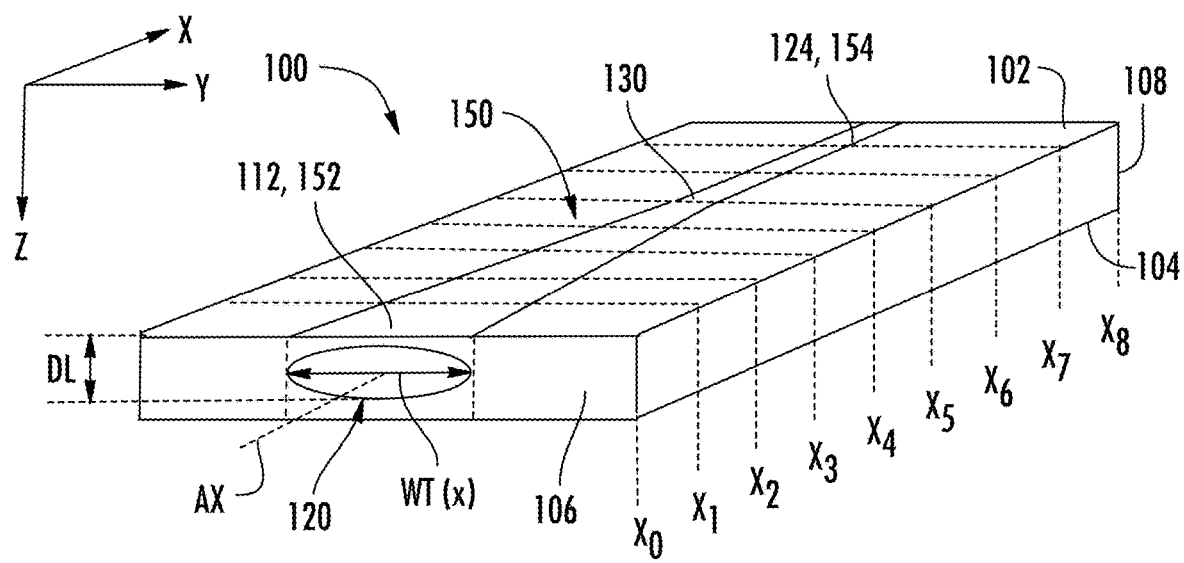
FIG. 3A is a front elevated view.
Figure 3B:
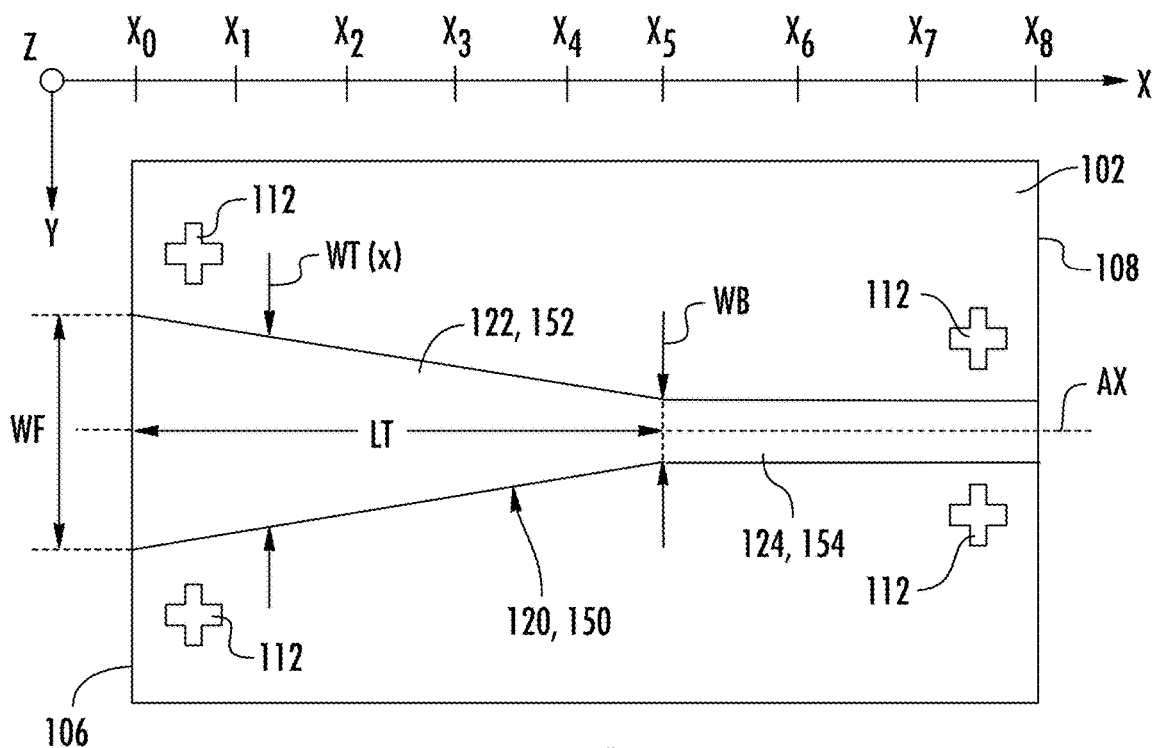
FIG. 3B is a top-down view and FIG. 3C is a side view of an example glass substrate that supports an IOX waveguide having a tapered section and a non-tapered section and shows nine example relative x-positions $x_0$ through $x_8$.
Figure 3C:
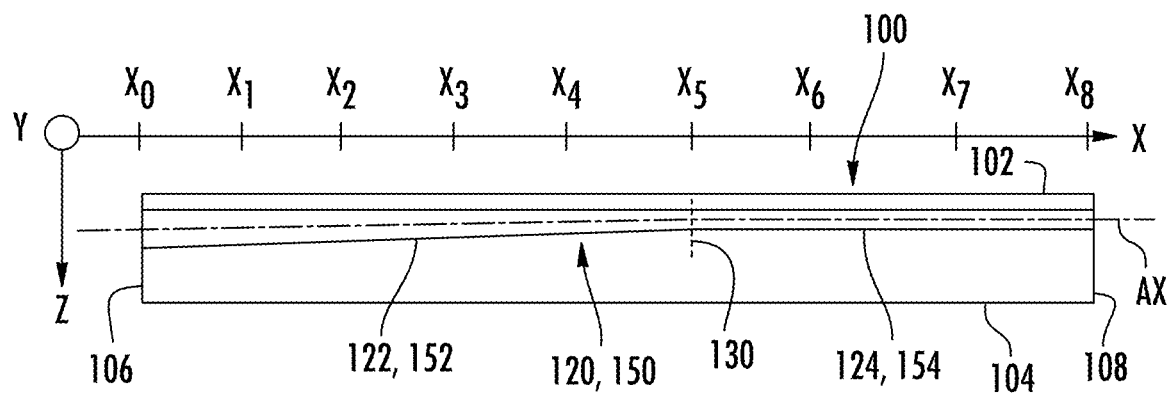

FIG. 3A is a front elevated view, FIG. 3B is a top-down view and FIG. 3C is a side view of an example glass substrate 100 that has a top surface 102, a bottom surface 104, a front end 106 and a back end 108. The substrate 100 has a bulk refractive index $n_0$. FIGS. 3A through 3C include nine example x-distance positions $x_0$ through $x_8$ for reference. Example glass types for the glass substrate 100 include borosilicate glass and aluminosilicate glass each containing sodium in sufficient amounts to enable an IOX change process that can form an IOX waveguide. In example glass substrate 100 contains between 3 mol % and 15 mol % $Na_2O$ so that $Na^+$ ions from the glass substrate can be exchange with another suitable external ion such as $K^+$ or $Ag^+$ in used in the IOX process.

The glass substrate 100 includes an IOX region 120 that resides adjacent the top surface 102. The IOX region 120 has a central axis AX that runs down the IOX region in the x-direction through the locations of maximum refractive index $n_1$ that occur in the x-y plane for a given x position. The IOX region 120 is formed using one of the various IOX process as known in the art. For example, the shape of the IOX region can be defined using photolithographic processes that can include forming on the top surface 102 a mask that includes an aperture of a select size and shape through which the IOX process takes place. Alternatively, a thin film layer that includes the externally introduced diffusing ion can be formed to have a pattern selected to correspond to a desired shape of the IOX region 120. This thin film layer can be deposited on the top surface 102 of the glass substrate for the IOX process instead of using a salt to provide the diffusing ion. For example, the thin film can be a silver film to provide $Ag^+$ ions for an $Ag^+$—$Na^+$ IOX process. Alternatively, a salt bath of molten $AgNO_3$ can be used.

Once the IOX process is completed, the mask or the excess thin film material can be removed. In an example, the IOX region 120 is buried, i.e., it has a refractive index profile n(z) in the z-direction with a maximum refractive index $n_1$ and a refractive index at the top surface 102 of $n_s$, wherein $n_s < n_1$. In an example where $n_s > n_0$, the top of the IOX region 120 is defined by the top surface 102 of the glass substrate 100. In an example where $n_s = n_0$, then the top of the IOX region 120 is defined by the z-location closest to the top surface 102 where the refractive index starts to increase from the bulk refractive index $n_0$.

The depth of layer DL of the IOX region 120 is shown in FIG. 3A and is defined as the distance from the top surface 102 to the depth z where the refractive index $n(z)=n_0$, i.e., the bulk refractive index of the glass substrate 10. Example IOX processes that can be used to create this buried configuration for the IOX region 120 can include a two-step thermal process and a field-assisted process, or a combination thereof.

The refractive index contrast Δn and the depth of layer DL for the IOX region 120 can vary depending on the width of the mask opening or the thin-film width, which in an example these widths can be in the range 1 µm to 13 µm. Larger mask openings or wider thin-films increase the number of modes the resulting IOX waveguide can support due mainly to increase in the overall width of the resulting IOX waveguide.

In an example, the IOX region 120 includes a tapered section 122 adjacent the front end 102 of the glass substrate 110 and a non-tapered (e.g., straight) section 124 adjacent the back end 104 of the glass substrate. The taper varies in the x-direction, which is the axial direction, and so can be referred to herein as an axial taper. In an example, the taper is geometric, i.e., the shape of the IOX region changes as a function of the x-coordinate. In an example, the geometric taper is in the x-y plane (see FIG. 3B) as well as in the x-z plane (see FIG. 3C) and so includes an axial taper as well as a lateral taper.

The taper of the tapered section 122 can also be intrinsic, such has having a refractive index profile that changes or tapers as a function of the x-coordinate. Thus, in various examples, the taper of the tapered section 122 can be geometric or intrinsic, or both geometric and intrinsic. The geometric and intrinsic configuration for the taper of the tapered section 122 is considered presently by way of example, while a purely intrinsic taper is discussed in greater below. The transition between the tapered section 122 and the non-tapered section 124 occurs at a transition location 130 associated with the example relative x-coordinate $x_5$. The tapered section 122 has an axial taper length LT.

For a geometrical taper, the tapered section 122 has a front-end width WF at the front end 104 of the glass substrate 100, and a back-end width WB at the transition location 130 corresponding to the relative x-position $x=x_5$. In an example, the back-end width WB is constant from the transition location 130 to the back end 106 of the glass substrate 100. The width of the tapered section 122 at an x-position along the taper is denoted WT(x) and in an example ranges from the maximum width WF to the minimum width WB. In an example, the taper of the tapered section 122 is linear as shown by way of example, though a curved or non-linear taper can also be employed. An example tapered section 122 has a maximum width WF in the range from 5 µm to 15 µm, while the minimum width WB can be in the range from 1 µm to 4 µm. In the case of where the taper of the tapered section 122 is intrinsic only, WT(X)=WT=WB=constant.

The IOX region 120 defines, along with the portion of glass substrate 110 immediately surrounding the IOX region, an IOX waveguide 150. The tapered section 122 of the IOX region 120 defines a tapered IOX waveguide section 152 while the non-tapered section 124 of the IOX region defines a non-tapered IOX waveguide section 154. The IOX region 120 thus constitutes a core of the IOX waveguide 150 while the immediately surrounding portion of the substrate 100 constitutes a cladding of the IOX waveguide, wherein no is the "cladding" refractive index.

In an example shown in FIG. 3B, the glass substrate 100 includes one or more alignment features 112 that remain on the substrate after the IOX process and that can be used for aligning the fiber 10, as well as aligning an additional component 114 to the IOX waveguide 150, such as another optical fiber, an optical coupler, an optical detector, a photonic integrated circuit, a planar waveguide array, etc. The one or more alignment features 112 can be used for visual alignment and/or machine-vision alignment, as illustrated by sight lines 116, in combination with a precision component placement instrument (not shown), as is known in the art.

Figure 3D:
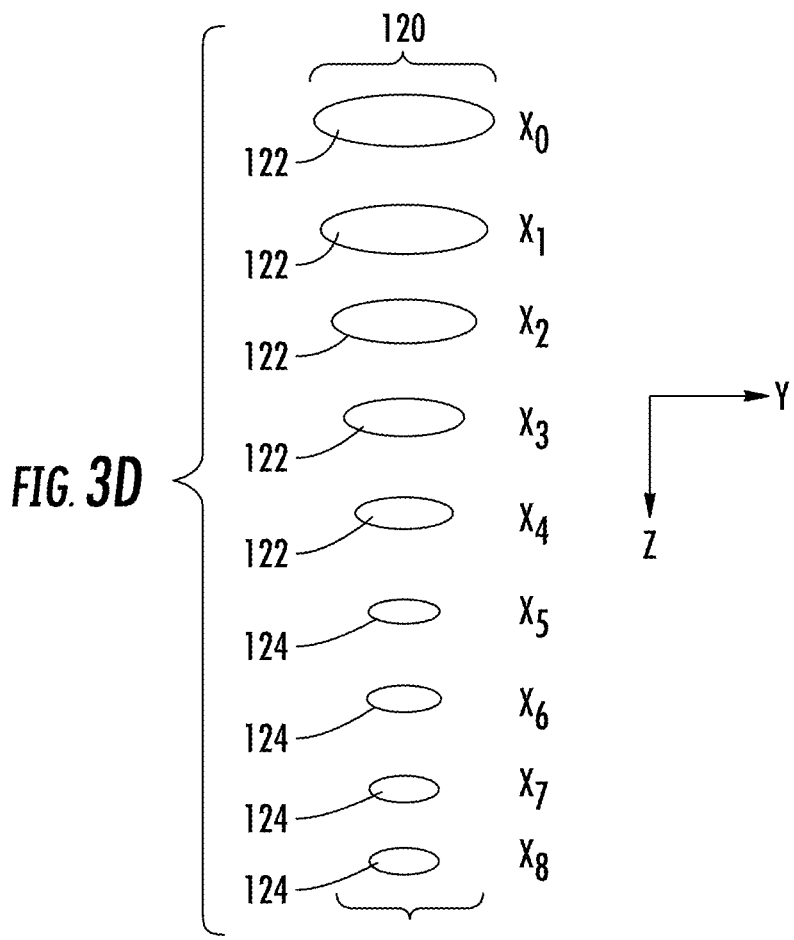
FIG. 3D shows cross-sections of the IOX region of the IOX waveguide taken at the nine example relative x-positions $x_0$ through $x_8$ along the length of the IOX waveguide illustrating an example of how the cross-sectional size of the IOX region can vary along length of the IOX waveguide.

FIG. 3D shows schematic y-z cross-sections of the IOX region 120 taken at nine different relative x-positions $x_0$ through $x_8$ along the length of the IOX waveguide. The y-z cross-sections illustrate an example of how the cross-sectional size of the IOX region 120 (and thus the IOX waveguide 150) can vary along its length. In an example, the IOX waveguide 150 is designed to operate at the same operating wavelength $\lambda$ as the fiber 10 and support up to a few (P) total modes in the tapered section 152 (e.g., $1 \leq P \leq 7$), while supporting just a single mode in the non-tapered section 154.

In an example, the taper of the tapered section 152 is adiabatic so that changes in the mode structure of the one or more guided modes occur sufficiently slow so that there is no optical loss. This requires that the scale of the taper be much greater than the operating wavelength $\lambda$. For telecommunication wavelengths on the order of 1 micron, the adiabatic condition is satisfied by having the taper (whether geometric or intrinsic or both) occur over a length LT measured in millimeters, e.g., at least 0.5 mm or greater. In an example, the taper length LT is between 0.5 mm and 40 mm or 1 mm to 40 mm. Because the taper of the taper section 152 changes the mode structure, the waveguide effective index $N_W$ for each waveguide mode can have a range over the length of the tapered section. This feature is discussed in greater detail below.

Figure 4A:
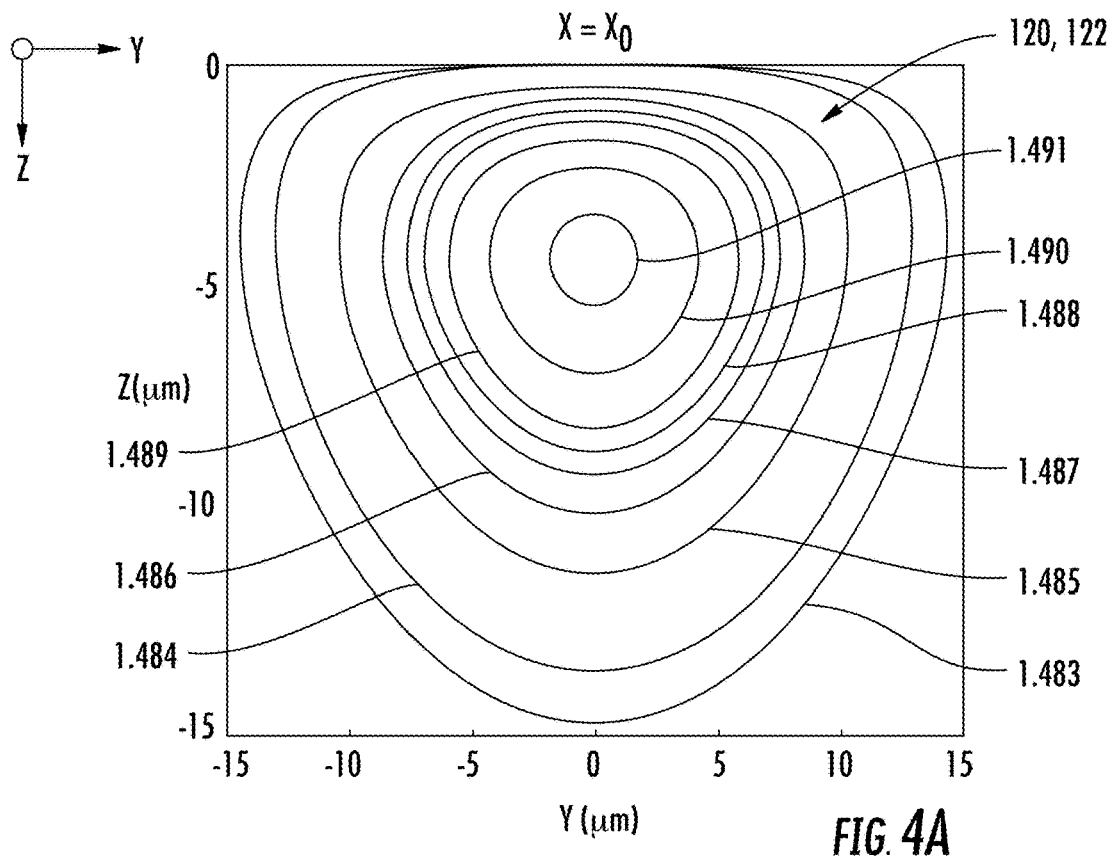
FIGS. 4A and 4B are y-z plots of refractive index contours for the refractive index profiles n(y,z) of the IOX region for an operating wavelength of 1310 nm and taken at two different example relative x-positions $x=x_0$ (FIG. 4A) and $x=x_5$ (FIG. 4B), based on computer simulations of the IOX process used to form the tapered waveguide, with the y and z scales in microns (μm).
Figure 4B:
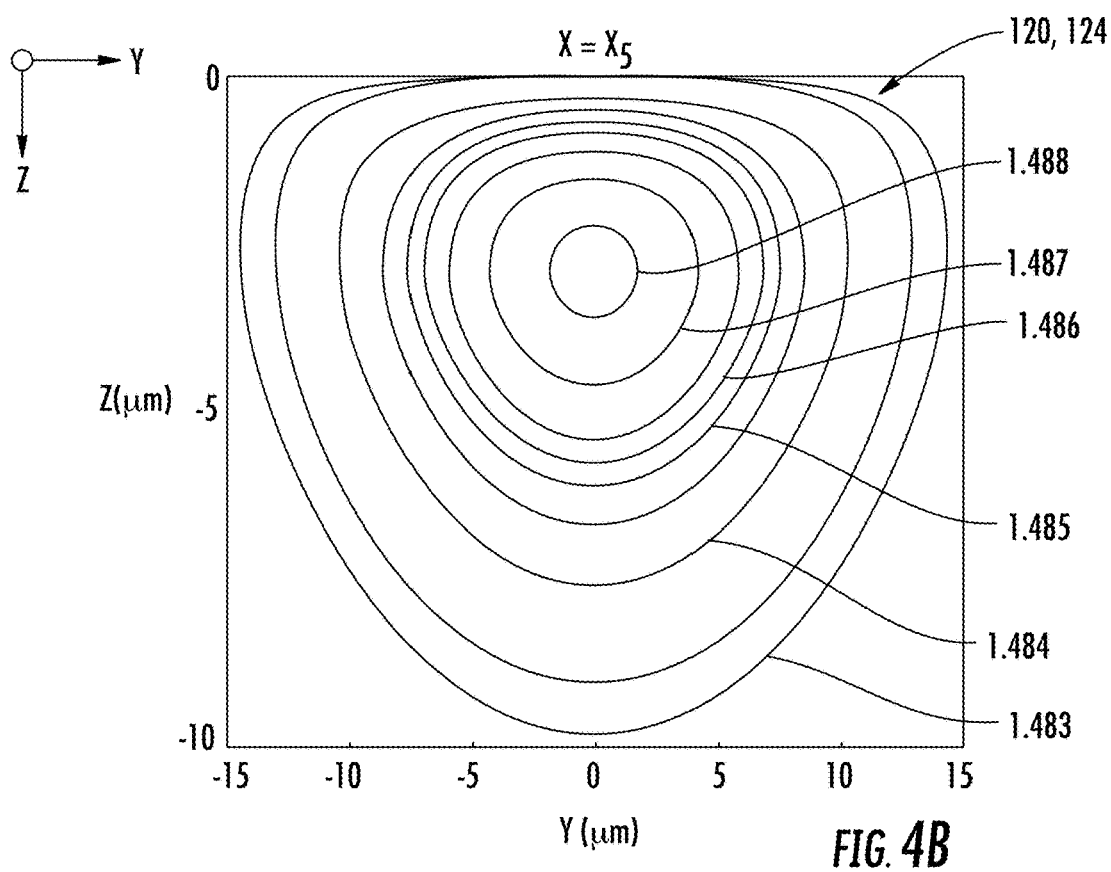

FIGS. 4A and 4B are y-z plots of refractive index contours for the refractive index profiles of the IOX region 120 taken at two different relative x-positions, namely at $x=x_0$, i.e., the front end 106 of the glass substrate, and at $x=x_5$, which is designated in FIGS. 3A and 3B as the transition location 130 and thus at the narrow back end of the tapered section 122. The refractive index contours for the three-dimensional refractive index profile n(x, y, z) were calculated using computer simulations of the IOX process used to form the IOX region 120 and were calculated for an operating wavelength $\lambda$ of 1310 nm. Note how the central axis AX of the IOX region 120 resides at about $z=4.5$ μm at the front end of the tapered section 122 (FIG. 4A) and resides at about $z=3$ μm at the back end of the tapered section. This difference in z-positions for the central axis AX describes the amount of intrinsic refractive index taper of the tapered section 120 in the x-direction. The maximum refractive index $n_1$ ranges from about $n_1=n_{1B}=1.488$ (FIG. 4B) the back end of the tapered section at the relative axial position $x=x_5$ to $n_1=n_{1F}=1.49$ (FIG. 4A) at the front end of the tapered section at the relative axial position $x=x_0$, while the bulk refractive index $n_0$ is about 1.4825. The intrinsic refractive index taper is defined by an axial refractive index profile $n_T(x)$, wherein the index taper has axial refractive index contrast $\Delta n_T(x)=n_{1F}-n_{1B}=0002$. The change in refractive index per unit length of the tapered section 122 is given by $\Delta n_T(x)/LT$. Note that the IOX region 120 also has a gradient refractive index profile in y-direction and z-direction that also changes as a function of the x-coordinate. The disclosed concepts may be used with other operating wavelength values over a range of wavelengths such as between 800 nanometers and 1600 nanometers.

FIG. 4A shows an example few-mode tapered section 152 of the IOX waveguide 150 based on a mask having a 10 μm wide opening. The actual width WF of the tapered section 122 of the IOX region 120 is about 26 microns due to lateral diffusion in the IOX process. The depth of layer DL is about 13 microns. FIG. 4B shows the single mode non-tapered section 154 of the IOX waveguide 100 is based on a mask having a 3 μm wide opening. The actual width WB of the back end of the tapered section 122 of the IOX region 120 is about 18 microns while the depth of layer DL is about 10 microns. A linear variation in the width WT(x) of the tapered region 152 of the IOX waveguide can be formed by a corresponding linear variation in the mask width from 10 μm to 3 μm.

Evanescent Coupler

Figure 5A:
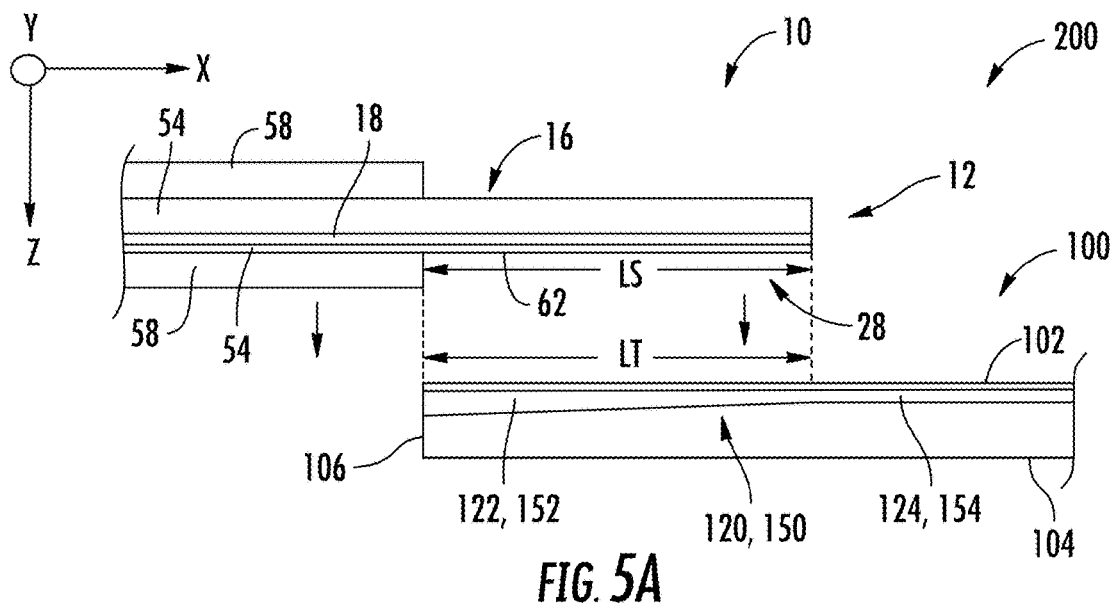
FIG. 5A is an exploded side view and FIG. 5B is an exploded top-elevated view of the stripped portion of the end section of the fiber disposed above the tapered section of the IOX waveguide as part of the process of forming the evanescent coupler as disclosed herein.
Figure 5B:
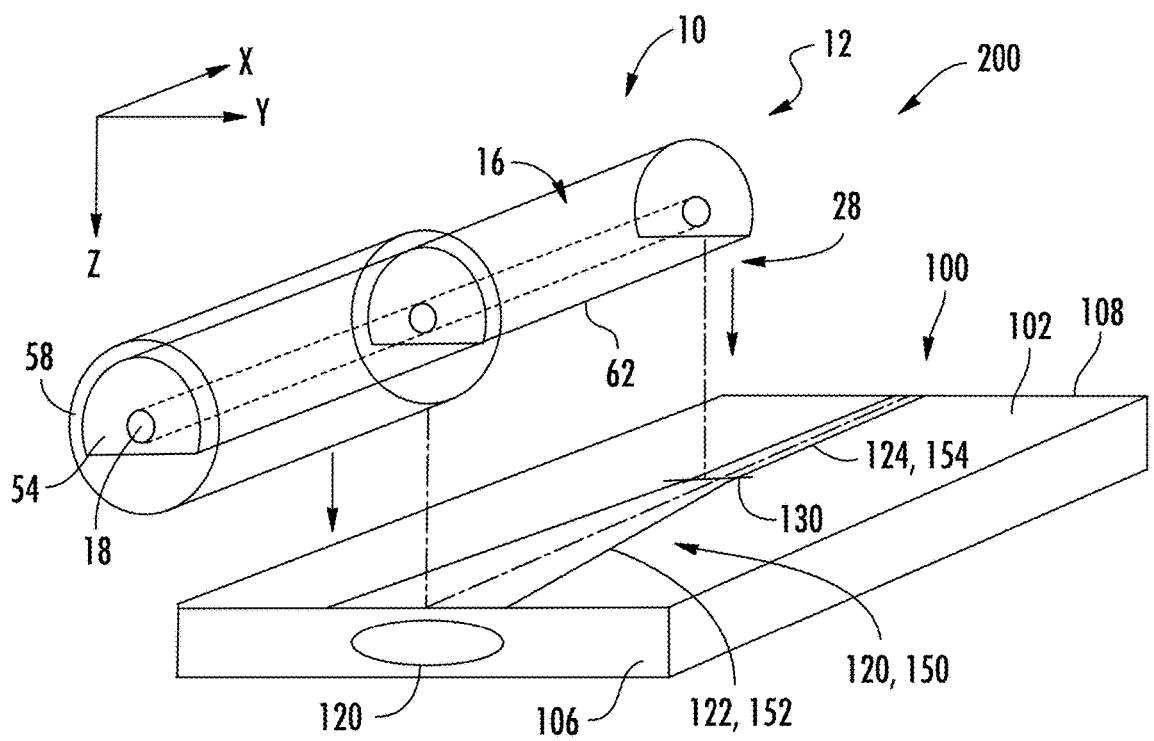
Figure 6A:
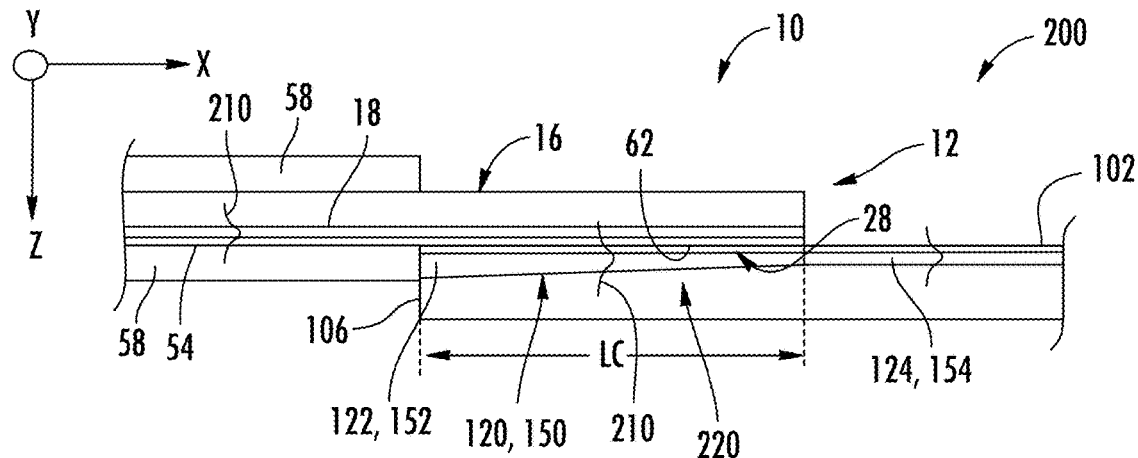
FIG. 6A and FIG. 6B are similar to FIGS. 5A and 5B respectively, and show the stripped portion of the end section of the fiber operably disposed on the tapered section of the IOX waveguide to form the evanescent coupler as disclosed herein.
Figure 6B:
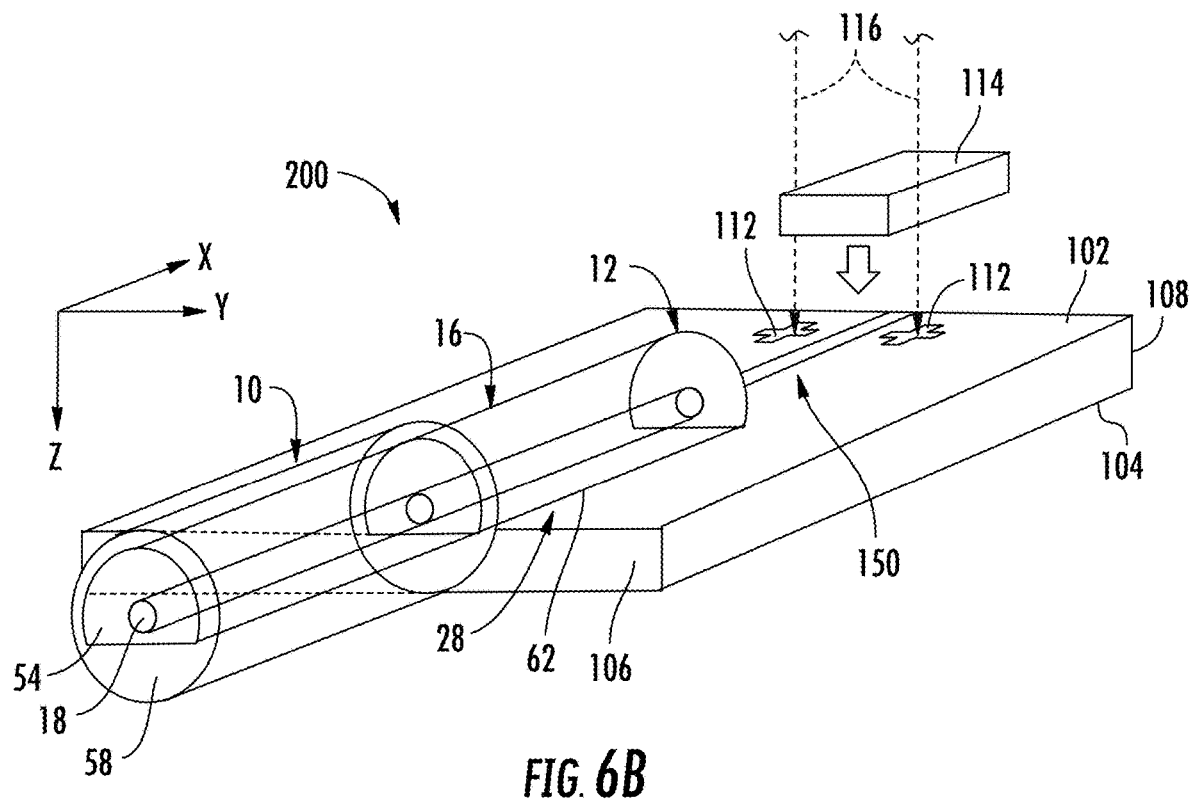

FIG. 5A is an exploded side view and FIG. 5B is an exploded top-elevated view of the stripped end portion 28 of the end section 12 of the fiber 10 disposed above the tapered section 152 of the IOX 150 waveguide as part of the process of forming an evanescent coupler 200 as disclosed herein. FIG. 6A and FIG. 6B are similar to FIGS. 5A and 5B respectively and show stripped portion 28 of the end section 12 of the fiber 10 interfaced with the tapered section 152 of the IOX waveguide 150 to form the example evanescent coupler 200 as disclosed herein.

Figure 7A:
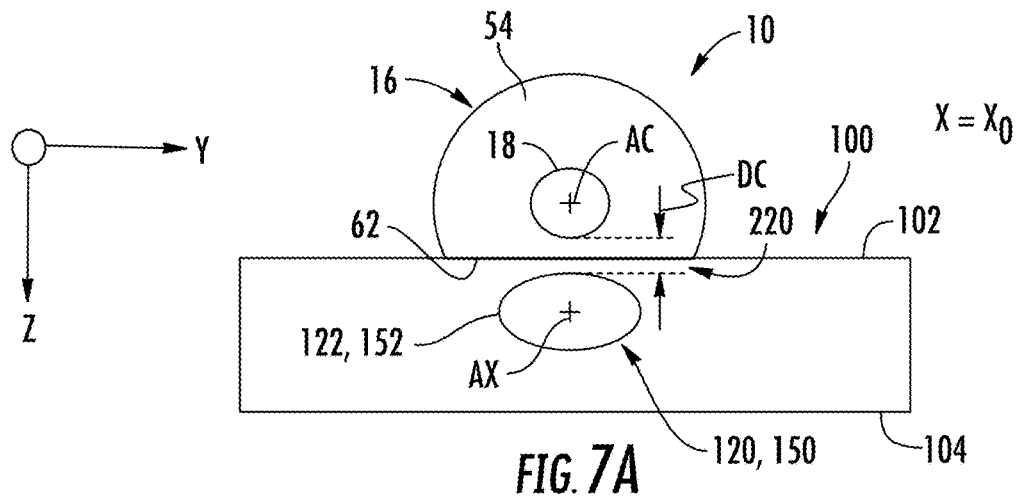
FIGS. 7A through 7C are y-z cross-sectional views of the evanescent coupler of FIGS. 6A and 6B taken at three of the different example relative x-positions $x_0$, $x_3$ and $x_6$ (see also FIG. 3A).
Figure 7B:
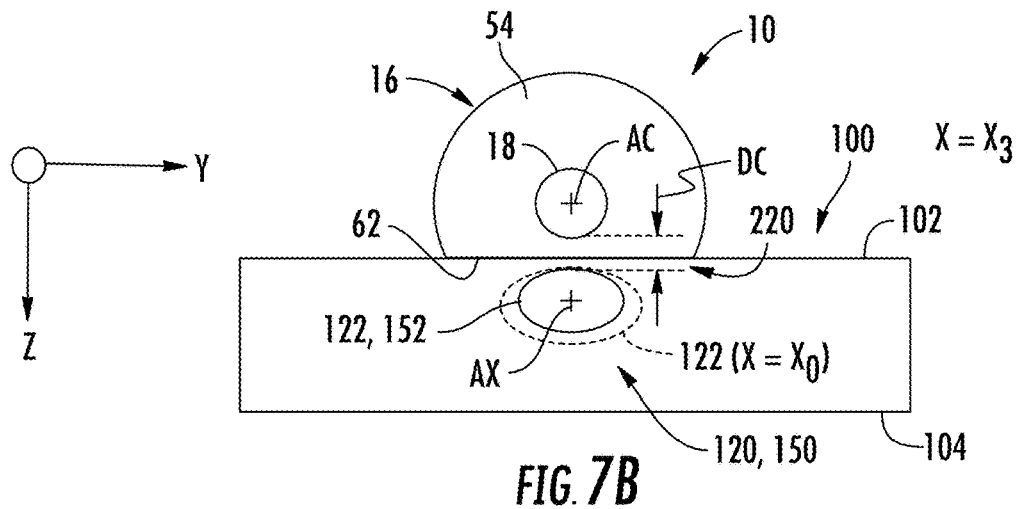
Figure 7C:
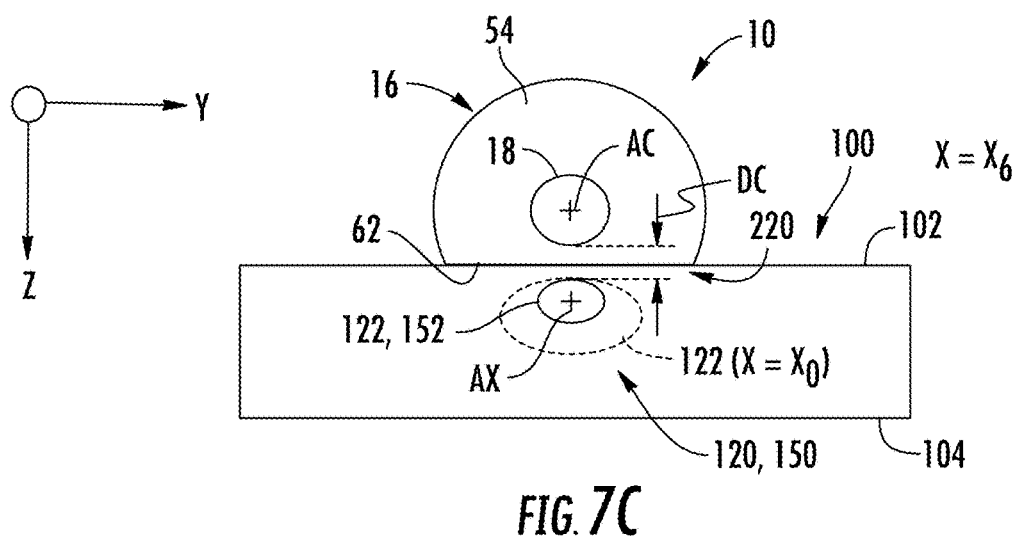

FIGS. 7A through 7C are x-y cross-sectional views of the evanescent coupler 200 of FIGS. 6A and 6B taken at three different relative x-positions $x_0$, $x_3$ and $x_6$ such as shown in FIG. 3A. FIGS. 7B and 7C show the front-end (i.e., $x=x_0$) size and location of the IOX region 120 (dashed line) for comparison.

A guided wave optical signal 210 is shown in FIG. 6A traveling within the fiber 10 from left to right. The guided wave optical signal 210 travels in a fiber fundamental mode and is evanescently coupled into the IOX waveguide 150, where it travels as a IOX waveguide mode. The guided wave optical signal 210 can also travel from right to left in the IOX waveguide 150 and then be evanescently coupled into the fiber 10.

The region of overlap between the stripped end portion 28 at the fiber end 12 and the tapered section 152 of the IOX waveguide 150 defines a coupling region 220 over which the guided wave optical signal 210 can be coupled between the fiber 10 and the IOX waveguide 150. The coupling region has a coupling length LC, which in an example is defined by the taper length LT.

In an example, a gap (not shown) can exist between the flat glass-portion surface 62 of the fiber 10 and the top surface 102 of the glass substrate 10. This gap can be filled with an optical material, like an adhesive or sol-gel, for refractive index matching and/or mechanical attachment of the fiber 10 to the glass substrate 100.

Evanescent coupling of the guide wave optical signal 210 from the fiber fundamental mode to the IOX waveguide fundamental mode can take place with efficiency approaching 100% when the fiber propagation constant $\beta_{F0}$ and the waveguide propagation constant $\beta_{W0}$ (or equivalently the fiber effective index $N_{F0}$ and the waveguide effective index $N_{W0}$) for the respective fundamental modes are closely matched over the coupling length LC. The coupling length LC depends strongly on a coupling distance DC between the core 18 of the fiber 10 and IOX region 120 of the IOX waveguide 150 (see FIG. 7A), since the overlap between the fiber and IOX mode fields of the fiber and the IOX waveguide decreases exponentially with distance. In an example, the coupling length LC is in the range 0.5 mm≤LC≤40 mm or 1 mm≤LC≤40 mm. In an example, the coupling distance DC is in the range 0 μm≤DC≤10 μm.

An advantage of using the fiber 10 having D shape is that the fiber core 18 resides at or very close to the glass-portion surface 62 and more particularly within a coupling distance DC so that the fiber core can reside sufficiently close to the IOX region 120 (i.e., IOX waveguide core) to allow for efficient evanescent coupling to occur.

The maximum amount of optical power that can be coupled between the fiber 10 and the IOX waveguide 150 also inversely depends on the difference between fiber propagation constant $\beta_{F0}$ and the waveguide propagation constant $\beta_{W0}$ of the fiber and waveguide fundamental modes, hence the requirement of matching the fiber and waveguide propagation constants $\beta_{F0}$ and $\beta_{W0}$ or equivalently matching the fiber and waveguide effective indices $N_{F0}$ and $N_{W0}$ for the fiber and waveguide fundamental modes.

Most glasses suitable for performing an effective IOX process have a bulk refractive index $n_0$ higher than the core refractive index $n_{co}$ of single mode fiber 10 with a silica cladding 54. Recall, the fiber effective index $N_F$ is limited to the range between the cladding index $n_{cl}$ and the core index $n_{co}$, while the waveguide effective index $N_W$ is limited to the range between the bulk index $n_0$ and the maximum IOX region refractive index $n_1$. If $n_0 > n_{co}$, the fiber effective index $N_F$ cannot be made equal to (i.e., matched to) the waveguide effective index $N_W$ even by using the tapered section 152 of the IOX waveguide 150. In the examples cited above, the core refractive index $n_{co}$ of a typical single mode fiber 10 is about 1.4491 at an operating wavelength of 1550 nm or 1.4495 at an operating wavelength of 1310 nm, while the bulk refractive index $n_0$ of the glass substrate 100 is approximately 1.4799 at an operating wavelength of 1550 nm or 1.4825 at an operating wavelength of 1310 nm.

Accordingly, an aspect of the evanescent coupler 200 disclosed herein includes updoping the silica glass inner cladding 54 and the silica glass core 18 of the fiber 10 by an amount sufficient to raise the core and cladding refractive indices $n_{co}$ and $n_{cl}$ so that the fiber effective index $N_{F0}$ for the fiber fundamental mode can match the waveguide effective index $N_{W0}$ for the waveguide fundamental mode. In particular, this requires raising the fiber cladding refractive index $n_{cl}$ up to at least the bulk refractive index $n_0$ of the glass substrate 100. This translates into having cladding relative refractive index percent $\Delta_{cl}$ (%) for the fiber in the range from about 2% to 2.5% and a core relative refractive index percent $\Delta_{co}$ (%) for the fiber in the range from about 2.33% to 2.82% (with the condition that $\Delta_{cl}$ (%)<$\Delta_{co}$ (%) at an operating wavelength of $\lambda$=1310 nm. This is a relatively high up-doping and can be achieved for example by using Ti as an updopant. The impact of optical propagation loss that can be expected from high-concentration Ti-doping of the fiber 10 is minimized in this application, since the coupling length LC of the coupling region 220 (which by way of example is the same as the length LT of the tapered section 122 and the same as the length LS of the stripped end portion 28) is typically relatively short, e.g., from a just a few millimeters to at most a few meters long.

Since the updoping and overall fiber making process can introduces variations in the fiber effective index $N_{F0}$ of the fiber fundamental mode, the tapered section 152 of the IOX waveguide 150 is configured to provide a range $\Delta N_{W0}$ of waveguide effective indices $N_{W0}$ for the waveguide fundamental mode over the length LT of the tapered section.

For a thermal IOX process, the achievable refractive index contrast $\Delta n$, the depth of layer DL and IOX region width WT(x) depend on the mask (or film) configuration and in particular the width of the mask opening or the film width, as noted above. Thus, in an example, the fundamental mode effective index $N_F$ of the (single mode) fiber 10 is made to fall within the waveguide effective index range $\Delta N_{W0}$ of the fundamental mode of the tapered section 152 of the IOX waveguide 150.

Figure 8A:
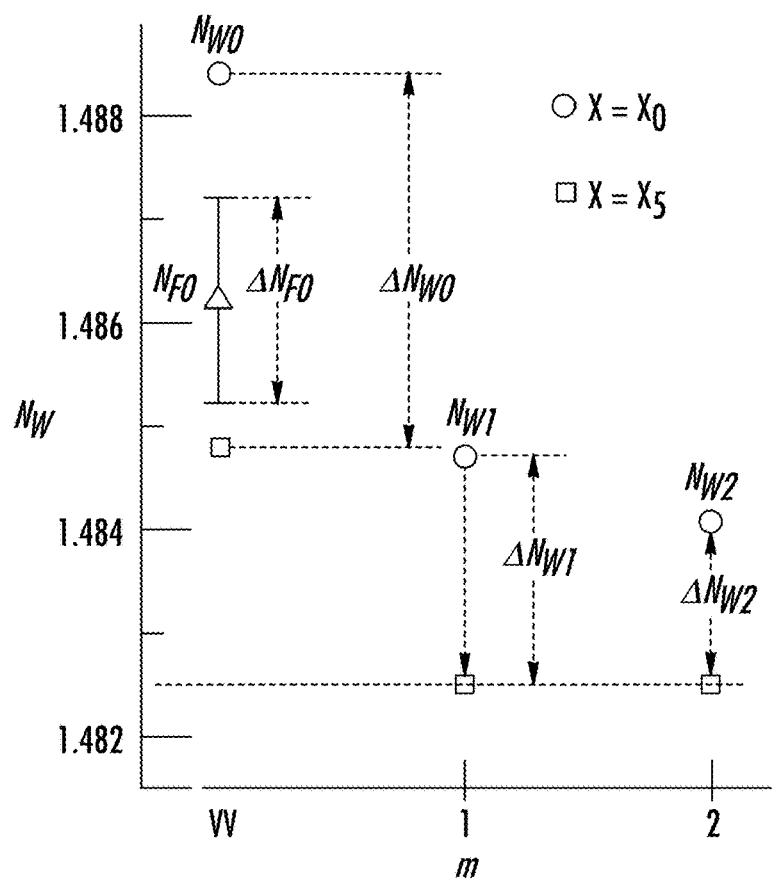
FIG. 8A is a plot of the waveguide effective indices $N_W$ of the tapered section of the IOX waveguide versus the IOX waveguide mode number m showing the change in the waveguide effective indices $N_{W0}$, $N_{W1}$ and $N_{W2}$ for the m=0, 1 and 2 waveguide modes, respectively, and showing the range $\Delta N_{W0}$ of the fundamental mode (m=0) effective index $N_{W0}$ over the length of the tapered section, along with a design fiber effective index $N_F$ and its range $N_F$ based on manufacturing variations in the updoping of the fiber.

FIG. 8A is a plot of the waveguide effective indices $N_W$ of the tapered section of the IOX waveguide versus the IOX waveguide mode number m for three waveguide modes m=0, 1 and 2, where m=0 is the fundamental mode. The waveguide effective indices for the m=0, 1 and 2 are respectively denoted as $N_{W0}$, $N_{W1}$ and $N_{W2}$ and are shown for the front end of the tapered section (x=$x_0$) and the back end of the tapered section (x=$x_5$), along with their respective ranges $\Delta N_{W0}$, $\Delta N_{W1}$ and $\Delta N_{W2}$ over the length of the tapered section 152.

Figure 8B:
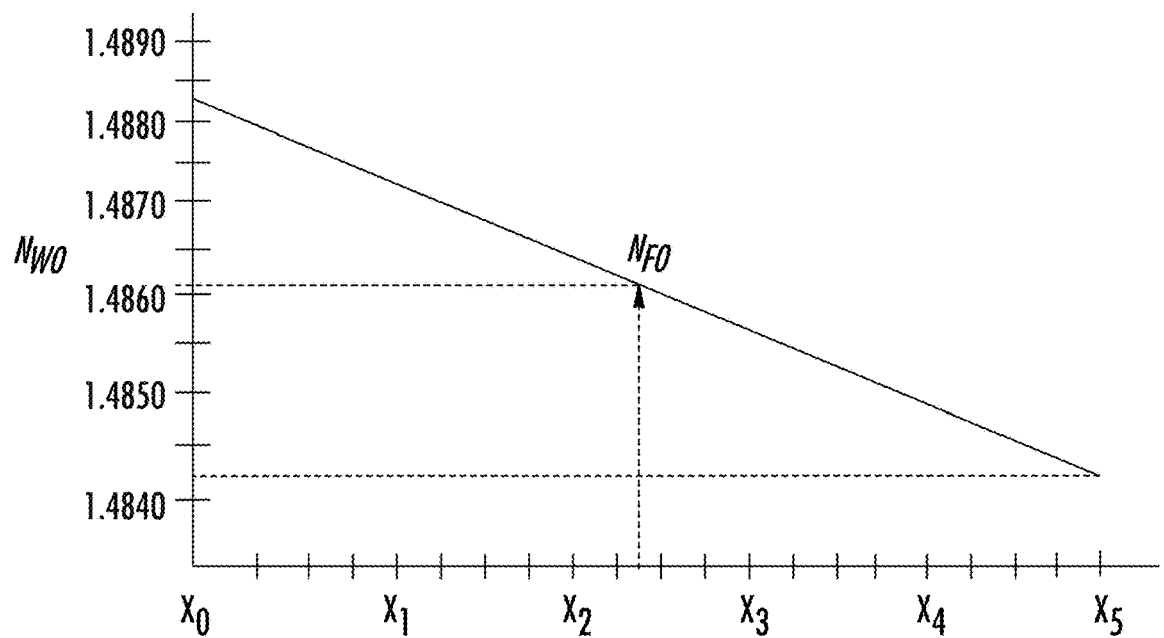
FIG. 8B is a plot of the fundamental mode waveguide effective index $N_{W0}$ versus distance x (arbitrary units) showing how the waveguide effective index $N_{W0}$ varies along the axial length of the taper from the front end ($x=x_0$) to the back end ($x=x_5$), and showing how the fiber effective index $N_{F0}$ for the fiber fundamental mode matches the waveguide effective index $N_{W0}$ for the waveguide fundamental mode an axial position between $x_2$ and $x_3$ along the tapered section of the IOX waveguide.

Of particular interest in FIG. 8A is the waveguide effective index range $\Delta N_{W0}$ for the waveguide fundamental mode. FIG. 8B is a plot of the waveguide effective index $N_{W0}$ versus distance x (arbitrary units) showing how the waveguide effective index $N_{W0}$ for the waveguide fundamental mode (m=0) varies along the length of the taper from the wide end (x=$x_0$) to the narrow end (x=$x_5$). In the example, the waveguide effective index range $\Delta N_{W0}$ is defined by a low-end value of the waveguide effective index $N_{W0}$ of 1.48425 and a high-end value of the waveguide effective index $N_{W0}$ of 1.48845, so that the span of waveguide effective index range $\Delta N_{W0}$ is 1.48845−1.48425=0.0042. In another example, the waveguide effective index range $\Delta N_{W0}$ is defined by a low-end value of the waveguide effective index $N_{W0}$ of 1.485 and a high-end value of the waveguide effective index $N_{W0}$ of either 1.4885 or 1.490, so that the span of waveguide effective index range $\Delta N_{W0}$ is 1.4885−1.485=0.0035 or 1.49−1.485=0.005, which represents an example maximum span for the multimode embodiment.

The plots of FIGS. 8A and 8B include a fiber effective index $N_{F0}$=1.4862 (triangle) for the fiber fundamental mode based on the fiber 10 having a core 18 with an 8 μm diameter and a step-index with a silica inner cladding 54 updoped to have a cladding relative refractive index percent of $\Delta_{cl}$ (%)≈2.44% (with respect to pure silica) and a core-clad index contrast percent $\Delta n$ (%)≈0.35% with respect to the updoped cladding of refractive index $n_{cl}$. This core-clad index contrast value is similar to a standard single mode fiber, but in the present example the fiber core and cladding refractive indices $n_{co}$ and $n_{cl}$ have been substantially increased via updoping to be more in line with the waveguiding parameters of the IOX waveguide 150.

The fiber effective index $N_{F0}$ includes a fiber effective index range $\Delta N_{F0}$ due to typical manufacturing variations in the updoping of the fiber 10 about the design value. Note also that the plot of FIG. 8A shows for the two higher-order modes m=1 and m=2, their corresponding waveguide effective indices $N_{W1}$ and $N_{W2}$ start out relatively close to $n_0$ and eventually bottom out at this value. This means that the higher-order modes are close to if not already radiation modes.

Note also that the waveguide effective index ranges $\Delta N_{W1}$ and $\Delta N_{W1}$ for the two higher-order modes m=1 and m=2 do not overlap the waveguide effective index range $\Delta N_{W0}$ for the waveguide fundamental mode. An intent of creating a few-mode tapered section 152 of the IOX waveguide 150 is to vary the waveguide effective index $N_{W0}$ of the fundamental mode so that it can provide a match to the fiber effective index $N_{F0}$ of the fiber fundamental mode (and the only mode) of the fiber 10 somewhere along the length of the tapered section. In FIG. 8B, this location is shown to occur at the relative x-position between $x_2$ and $x_3$, and more specifically between $x_{2.25}$ and $x_{2.5}$. Keeping the waveguide effective indices $N_W$ of the higher-order modes and the fiber effective index $N_{F0}$ away from each other prevents the optical energy from the fiber fundamental mode from coupling into the waveguide higher-order modes.

FIGS. 8A and 8B show that a tapered section 152 can have a taper that provides a waveguide effective index range $\Delta N_{W0}$ for the waveguide fundamental mode that can accommodate variations in the doping level of the fiber 10 to allow matching the fiber effective index $N_{F0}$ to the waveguide effective index $N_{W0}$ at some location (i.e., x-position) within the taper length LT. This configuration makes the evanescent optical coupler 200 tolerant to the process-induced variations in the fiber propagation constant $\beta_{F0}$ or the fiber effective index $N_{F0}$ of the fiber 10 as well as the process-induced variations in the waveguide propagation constant $\beta_{W0}$ or waveguide effective index $N_{W0}$ of the IOX waveguide 150.

Figure 9:
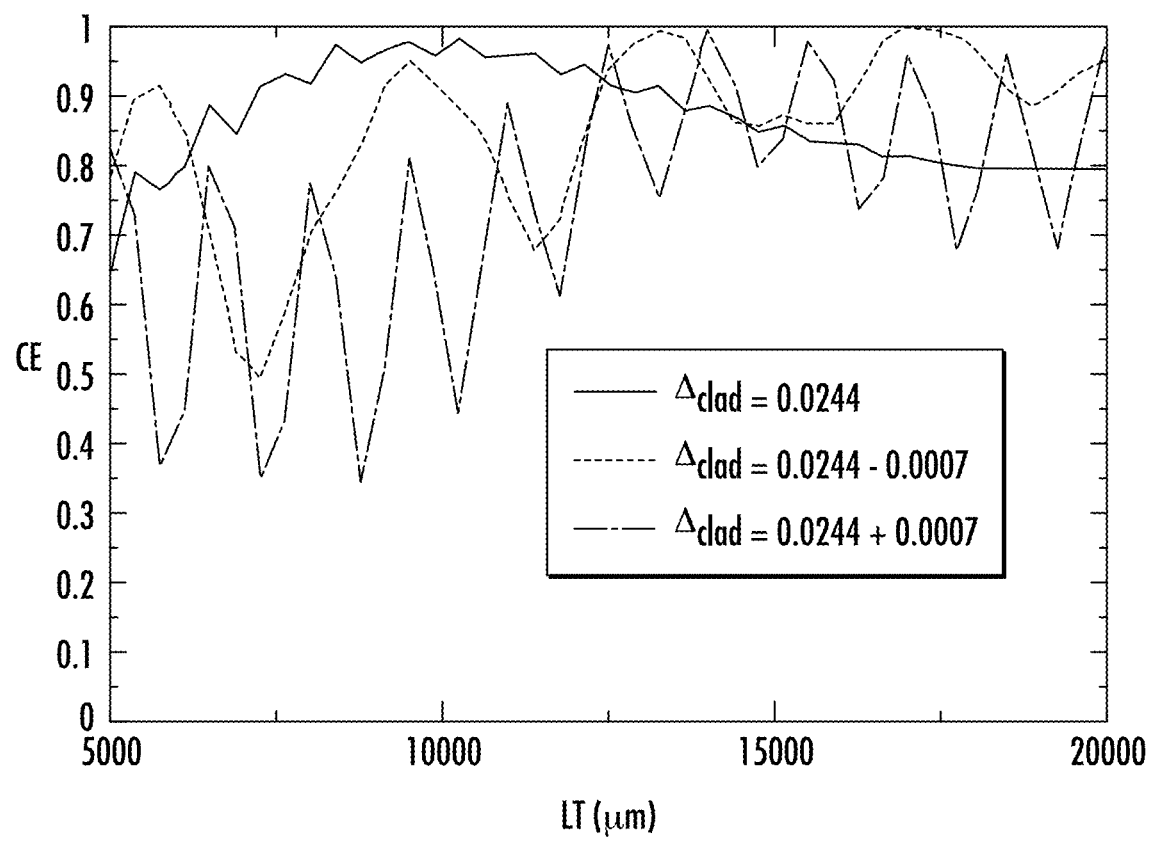
FIG. 9 is a plot of the coupling efficiency CE versus the taper length LT (μm) of the tapered section for three different example evanescent couplers with fibers having three different levels of fiber cladding updoping.

The effect of the higher-order modes supported by the tapered section 152 of the IOX waveguide 150 on the coupling efficiency with an updoped fiber 10 was evaluated using numerical simulations based on both the Eigen-Mode Expansion (EME) method and the Beam Propagation (BP) Method, with similar results. FIG. 9 is a plot of the coupling efficiency CE versus the taper length LT (μm) for three different example evanescent couplers with fibers having three different levels of fiber cladding up-doping $\Delta_{cl}$ (%), namely a main doping level of $\Delta_{cl}$%=2.44% and variations from this doping level of −0.07%, and +0.07%, which represent reasonable manufacturing variations in the updoping process. The plot of FIG. 9 shows that a coupling efficiency CE>80% and even CE>90% can be achieved with the evanescent optical coupler 200 disclosed herein.

Figure 10A:
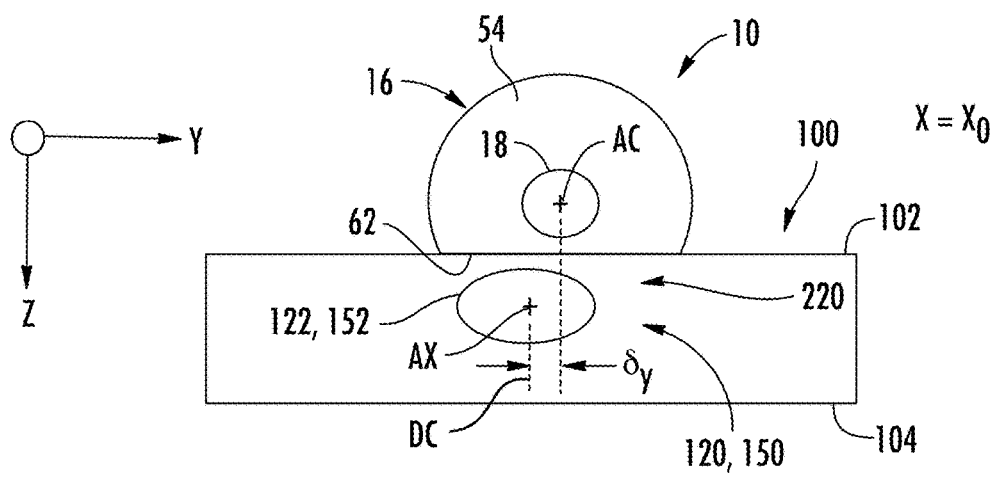
FIG. 10A is similar to FIG. 7A and illustrates an example evanescent coupler that has a lateral offset $\delta_y$ in the y-direction between the fiber and the IOX waveguide.
Figure 10B:
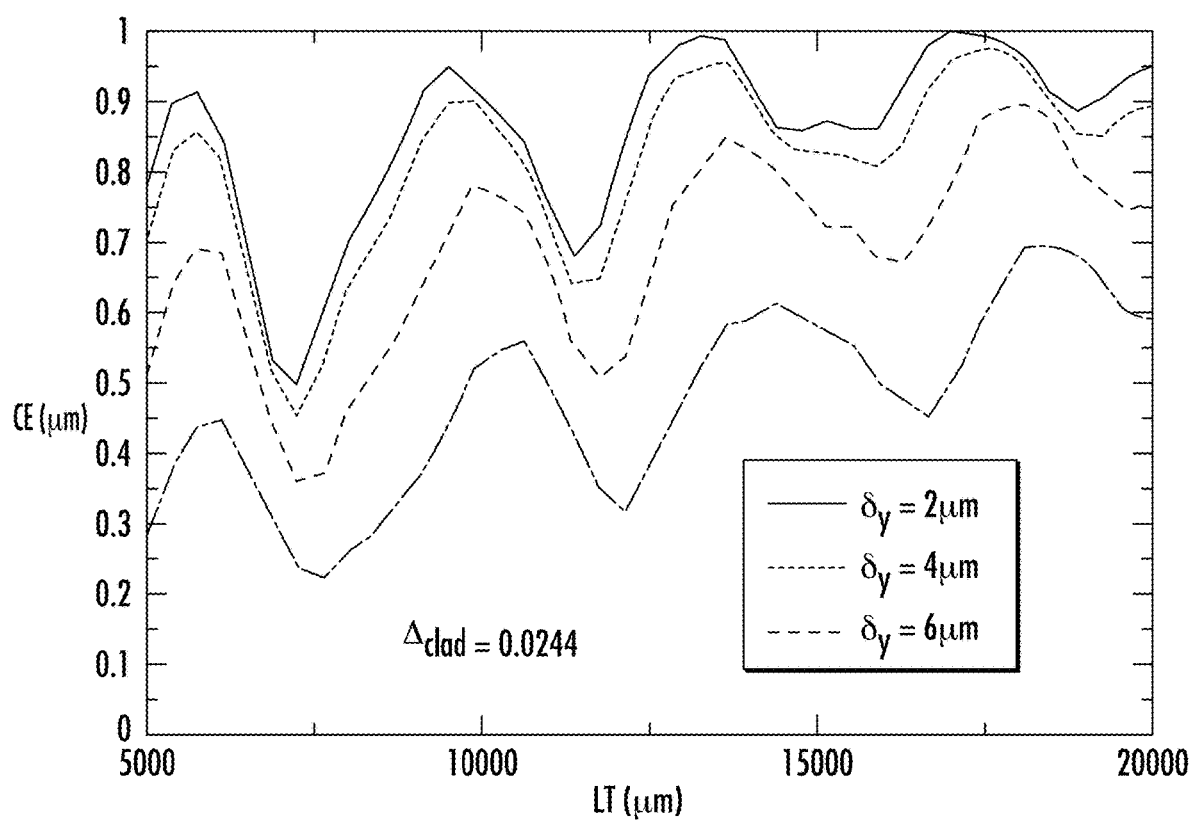
FIG. 10B is a plot of the coupling efficiency CE versus the taper length LT (μm) for an evanescent optical coupler that uses a fiber having a cladding $\Delta_{cf}(\%)=2.44\%$ and for four different lateral (i.e., y-direction) offsets of $\delta_y=0$ μm, 2 μm, 4 μm and 6 μm.

FIG. 10A is similar to FIG. 7A and illustrates an example evanescent optical coupler 200 that has a lateral offset $\delta_y$ in the y-direction between the fiber 10 and the IOX waveguide 150. FIG. 10B is a plot of the coupling efficiency CE versus the taper length LT (μm) for a fiber having a cladding $\Delta_{clad}$=2.44% and for four different lateral (i.e., x-direction) offsets of $\delta_x$=0 μm, 2 μm, 4 μm and 6 μm. The plots of FIG. 9 and FIG. 10B were computed using the EME method for a few-mode to single IOX waveguide taper design The results shown in FIGS. 9 and 10B indicate that a taper length LC can be designed to achieve a coupling efficiency CE>80% (less than 1 dB loss) for lateral offsets up to +/−4 microns and provide good tolerance to changes in the fiber mode effective index $N_F$ due to variations in updoping.

Single Mode Tapered Section

In an alternate embodiment, the tapered section 152 of the IOX waveguide 150 is single mode enabled by an intrinsic taper wherein the axial refractive index profile $n_T(x)$ of the tapered section 122 of the IOX region 120 decreases in the x-direction while the taper width WT(x) either decreases with in the x-direction or stays constant with the x-direction. These two configuration are illustrated schematically in the plots of FIGS. 11A and 11B, respectively, which includes the tapered refractive index profile $n_T(x)$ in the left-hand-side vertical axis with the front-end refractive index $n_{F1}$ and the back-end refractive index $n_{1B}$. The taper width WT(x) is on the right-hand-side vertical axis and includes the front-end width WF and back-end width WB. The relative the axial coordinate x is on the horizontal axis and spans from the relative x-position $x_0$ of the front end of the tapered section 122 of the IOX region 120 to the relative x-position of the back end of the tapered section at the transition location 130.

Figure 11A:
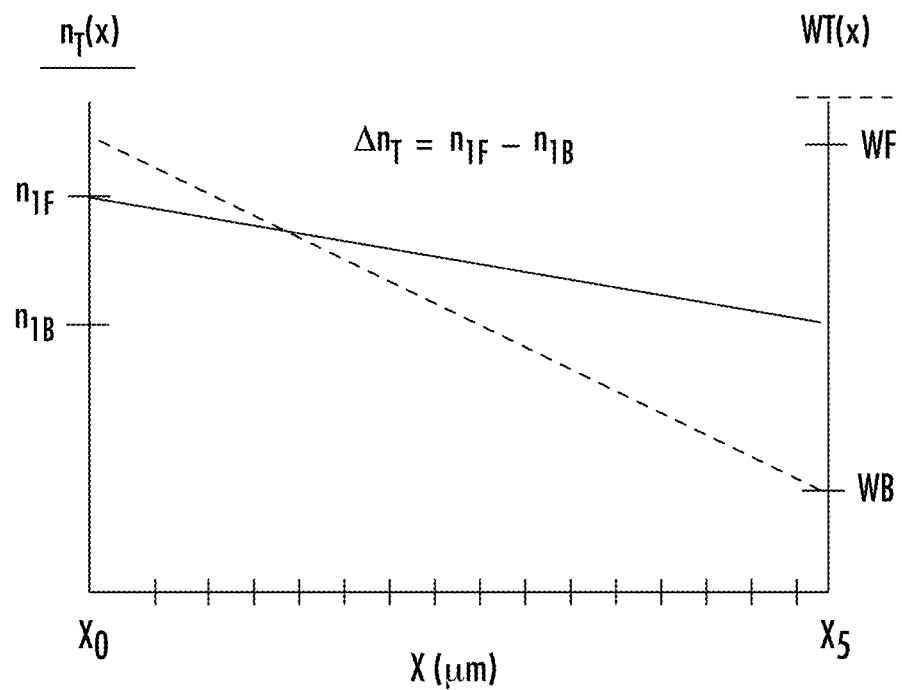
FIGS. 11A and 11B are schematic plots the axial refractive index n(x) of the tapered section of the IOX waveguide on the left-hand-side vertical axis and the taper width WT(x) on the right-hand-side vertical axis, along with the axial coordinate x (μm) on the horizontal axis to show how the tapered section can be made single mode by varying both the axial refractive index profile n(x) and the taper width WT(x) (FIG. 11A) or just the axial refractive index profile n(x).
Figure 11B:
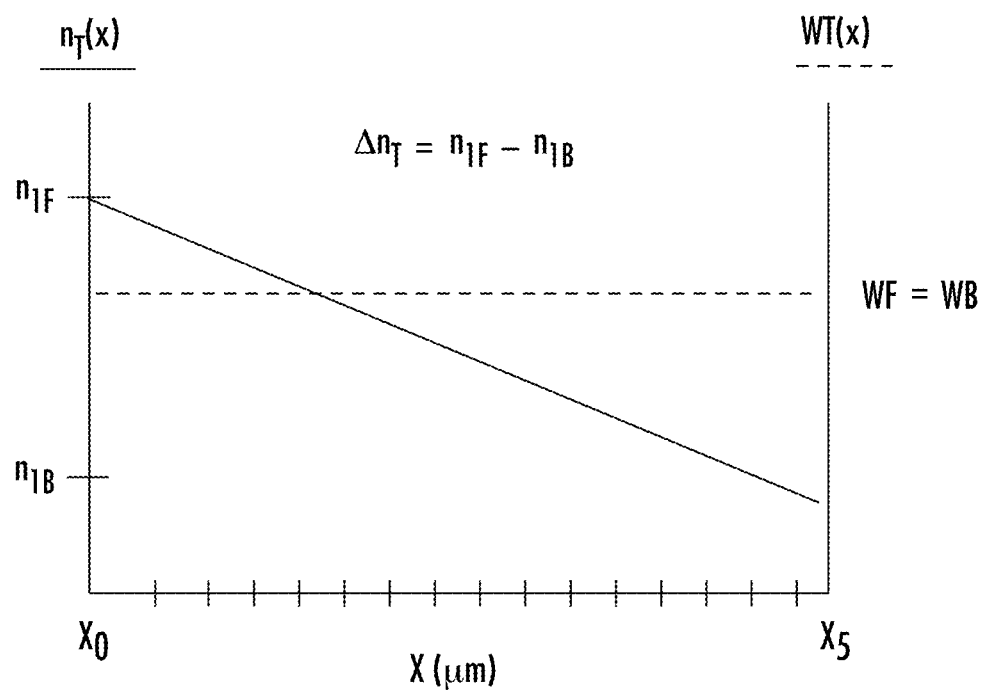

In the case of FIG. 11A where WT(x) is non-constant (i.e., defines a geometric taper), the axial refractive index constant $\Delta n_T = n_{1F} - n_{1B}$ can vary by a smaller amount than for the case of FIG. 11B where WT(x) is constant (i.e., there is no geometric taper). This is because for the case of only an intrinsic taper, the axial refractive index contrast $n_T(x)$ of the tapered section 120 of the IOX region 120 needs to account for all the change in the waveguide effective index $N_W$ over the taper length LT.

Figure 12:
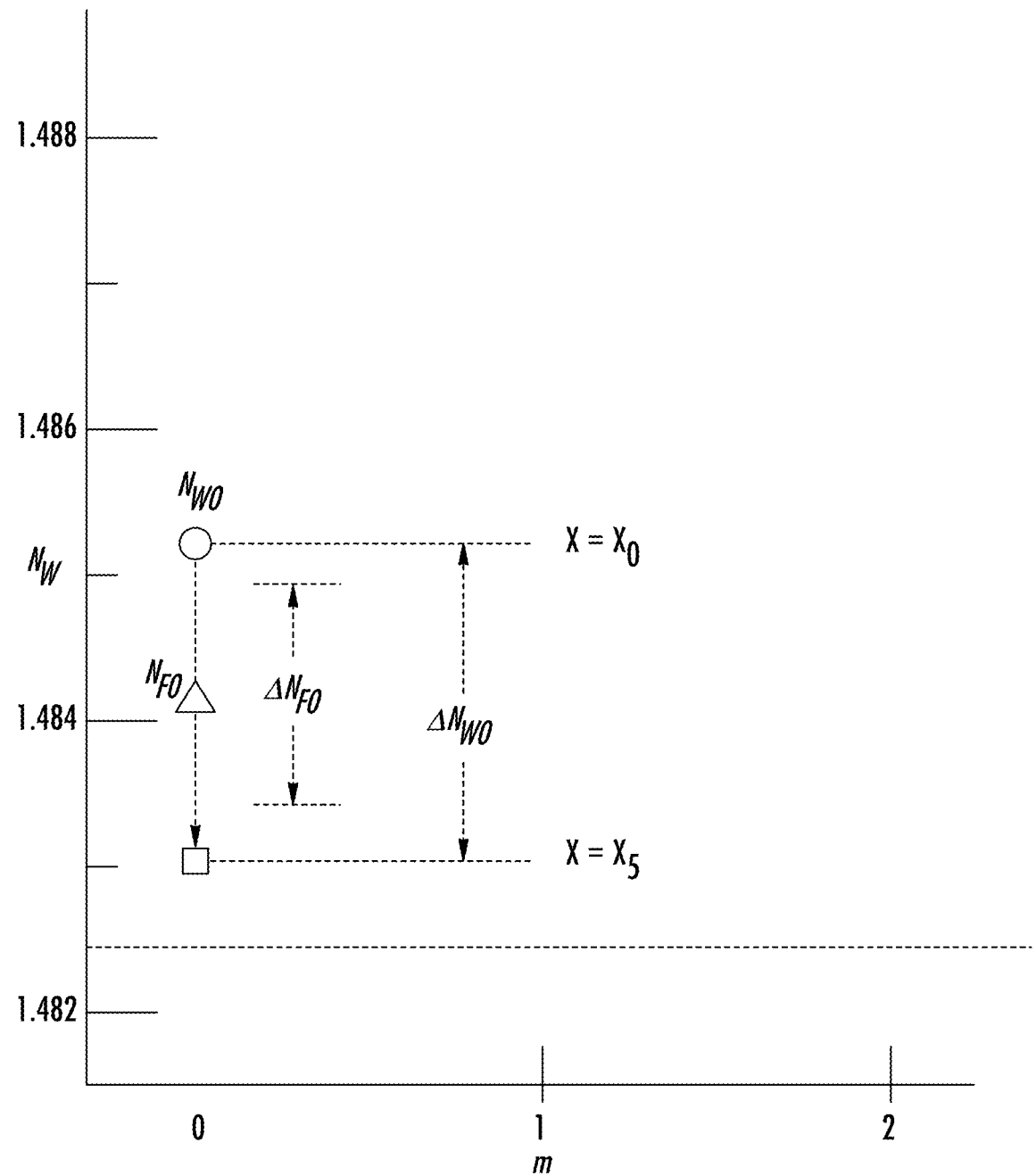
FIG. 12 is a plot similar to the plot of FIG. 8A and is for the case where the tapered section of the IOX waveguide is single mode (m=0).

FIG. 12 is similar to FIG. 8A and is for the case where the tapered section 152 of the IOX waveguide 150 is single mode. The waveguide effective index range $\Delta N_{W0}$ of this single mode configuration for the tapered section 152 of the IOX waveguide 150 is smaller than that for the case for the above-described few-mode configuration, and also has a smaller maximum waveguide effective index $N_{W0}$ for the waveguide fundamental mode as compared to that of FIG. 8A. The doping level of fiber 10 can be lowered (relative to the multimode case) to bring the fiber effective index $N_{F0}$ into the waveguide effective index range $\Delta N_{W0}$ for the waveguide fundamental mode for the single mode configuration of the tapered section 152 of the IOX waveguide 150.

In the single-mode embodiment of FIG. 12, the waveguide effective index range $\Delta N_{W0}$ is defined by a low-end value of the waveguide effective index $N_{W0}$ of 1.483 and a high-end value of the waveguide effective index $N_{W0}$ of 1.48525, so that the span of waveguide effective index range $\Delta N_{W0}$ is 1.48525−1.483=0.00225. In an example, the maximum span of waveguide effective index range $\Delta N_{W0}$ for the single-mode embodiment is about 0.0025 or 0.003.

While the embodiments disclosed herein have been set forth for the purpose of illustration, the foregoing description should not be deemed to be a limitation on the scope of the disclosure or the appended claims. It will be apparent to those skilled in the art that various modifications and variations can be made without departing from the spirit or scope of the claims.

It will be understood by one having ordinary skill in the art that construction of the described disclosure and other components is not limited to any specific material. Other exemplary embodiments of the disclosure disclosed herein may be formed from a wide variety of materials, unless described otherwise herein.

Where a range of values is provided, it is understood that each intervening value, to the tenth of the unit of the lower limit, unless the context clearly dictates otherwise between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

For purposes of this disclosure, the term "coupled" (in all of its forms: couple, coupling, coupled, etc.) generally means the joining of two components (optical, electrical or mechanical) directly or indirectly to one another. Such joining may be stationary in nature or movable in nature. Such joining may be achieved with the two components (optical, electrical or mechanical) and any additional intermediate members being integrally formed as a single unitary body with one another or with the two components. Such joining may be permanent in nature, or may be removable or releasable in nature, unless otherwise stated. It will be apparent to those skilled in the art that various modifications and variations can be made without departing from the spirit or scope of the claims.

For the purposes of describing and defining the present teachings, it is noted that the terms "substantially" and "approximately" and "about" are utilized herein to represent the inherent degree of uncertainty that may be attributed to any quantitative comparison, value, measurement, or other representation. The terms "substantially" and "approximately" and "about" are also utilized herein to represent the degree by which a quantitative representation may vary from a stated reference without resulting in a change in the basic function of the subject matter at issue.

It is to be understood that variations and modifications can be made on the aforementioned embodiments without departing from the concepts of the present disclosure, and further it is to be understood that such concepts are intended to be covered by the following claims unless these claims by their language expressly state otherwise.

What is claimed is:

1. An evanescent optical coupler, comprising:
   an ion-exchanged (IOX) waveguide formed in a glass substrate comprising a tapered section that runs in an axial direction and that supports a waveguide fundamental mode having a waveguide effective index $N_{W0}$ that varies within a range $\Delta N_{W0}$ as a function of the axial direction;
   an optical fiber that supports a fiber fundamental mode having a fiber effective index $N_{F0}$ that falls within the range $\Delta N_{W0}$ of the waveguide fundamental mode of the tapered section of the IOX waveguide; and
   wherein a portion of the optical fiber is interfaced with the tapered section of the IOX waveguide to define a coupling region over which evanescent optical coupling occurs between the optical fiber and the IOX waveguide.

2. The evanescent optical coupler according to claim 1, wherein the tapered section supports optical transmission of the waveguide fundamental mode and up to six waveguide higher-order modes.

3. The evanescent optical coupler according to claim 2, wherein the waveguide effective index range $\Delta N_{W0}$ has a maximum span of 0.005.

4. The evanescent optical coupler according to claim 1, wherein the portion of the optical fiber that interfaces with the tapered section of the IOX waveguide comprises a flat surface.

5. The evanescent optical coupler according to claim 1, wherein the tapered section of the IOX waveguide is optically coupled to a non-tapered section of the IOX waveguide that supports optical transmission of the waveguide fundamental mode.

6. The evanescent optical coupler according to claim 1, wherein the coupling region has a coupling length LC in the range from 1 millimeters to 40 millimeters.

7. The evanescent optical coupler according to claim 1, wherein the glass substrate comprises a borosilicate glass comprising sodium or an aluminosilicate glass comprising sodium.

8. The evanescent optical coupler according to claim 1, further comprising at least one alignment feature on a top surface of the glass substrate.

9. The evanescent optical coupler according to claim 1, wherein the evanescent optical coupler comprises an operating wavelength range between 800 nanometers to 1600 nanometers.

10. The evanescent optical coupler according to claim 1, wherein the evanescent optical coupling has a coupling efficiency CE>80%.

11. The evanescent optical coupler according to claim 1, wherein the optical fiber comprises a glass core and a glass inner cladding comprising a flat surface, and wherein the glass core resides within a distance DS of the flat surface of the glass inner cladding, wherein 0≤DS≤4 microns.

12. The evanescent optical coupler according to claim 1, wherein the taper of the tapered section is defined by an axial variation in a maximum refractive index of the tapered section and where the tapered section has a constant width.

13. The evanescent optical coupler according to claim 12, wherein the tapered section of the IOX waveguide supports optical transmission of only the waveguide fundamental mode and no higher-order modes.

14. The evanescent optical coupler according to claim 13, wherein the waveguide effective index range $\Delta N_{W0}$ has a maximum span of 0.003.

15. An evanescent optical coupler, comprising:
   a glass substrate having a top surface;
   an ion-exchanged (IOX) region formed in the glass substrate, wherein the IOX region and an immediately adjacent surrounding portion of the glass substrate define an IOX waveguide comprising a tapered section that runs in an axial direction and that supports optical transmission of a waveguide fundamental mode and up to six waveguide higher-order modes at an operating wavelength, wherein the waveguide fundamental mode has an effective index $N_{W0}$ that varies within an effective index range $\Delta N_{W0}$ as a function of the axial direction within the tapered section;
   a single mode optical fiber that supports a fundamental mode with a fiber effective index $N_{F0}$ at the operating wavelength, the optical fiber comprising a glass core with a core refractive index, a glass inner cladding with a cladding refractive index disposed about the glass core and comprises a flat surface, and wherein the glass core and the glass inner cladding are updoped so that the fiber effective index $N_{F0}$ falls within the effective index range $\Delta N_{W0}$ of the mode effective index $N_{W0}$ of the waveguide fundamental mode of the tapered section of the IOX waveguide; and
   wherein a portion of the flat surface of the glass inner cladding is interfaced with the tapered section of the IOX waveguide to establish evanescent optical coupling between the optical fiber and the IOX waveguide.

16. The evanescent optical coupler according to claim 15, wherein the glass inner cladding of the single mode optical fiber comprises a glass inner cladding and a polymeric outer cladding disposed about the glass inner cladding, and wherein an end section of the single mode fiber is stripped of the polymeric outer cladding to expose a flat surface of the glass inner cladding.

17. The evanescent optical coupler according to claim 15, wherein the flat surface of the glass inner cladding and the tapered section of the IOX waveguide define a coupling region having a coupling length LC in the range from 0.5 mm to 40 mm.

18. The evanescent optical coupler according to claim 17, wherein the core of the optical fiber and the IOX region of the IOX waveguide reside within a coupling distance DC that is in the range from 0 to 10 microns.

19. The evanescent optical coupler according to claim 15, wherein the glass substrate comprises between 3 mol % and 15 mol % of $Na_2O$.

20. The evanescent optical coupler according to claim 15, further comprising at least one alignment feature on the top surface of the glass substrate.

21. The evanescent optical coupler according to claim 15, wherein the evanescent optical coupling has a coupling efficiency CE>80%.

22. The evanescent optical coupler according to claim 15, wherein the glass core of the single mode optical fiber resides within a distance DS of the flat surface of the glass inner cladding, and wherein 0≤DS≤4 microns.

23. The evanescent optical coupler according to claim 15, wherein the operating wavelength is in the range from 800 nanometers to 1600 nanometers.

24. The evanescent optical coupler according to claim 15, wherein the taper of the tapered section has a constant width and is defined by an axial variation in a refractive index of the tapered section.

25. The evanescent optical coupler according to claim 15, wherein:
   i) the IOX waveguide supports only a fundamental mode and wherein the waveguide effective index range $\Delta N_{W0}$ has a maximum span of 0.003; or
   ii) the IOX waveguide supports the fundamental mode and up to six higher order modes and wherein the waveguide effective index range $\Delta N_{W0}$ has a maximum span of 0.005.

26. A method of performing evanescent optical coupling of an optical signal at an operating wavelength, comprising:
   interfacing an ion-exchanged (IOX) waveguide with an optical fiber to define a coupling region over which evanescent optical coupling occurs between the optical fiber and the IOX waveguide, wherein the IOX waveguide comprises a tapered section at the coupling region that supports a waveguide fundamental mode having a waveguide effective index $N_{W0}$ that varies within a waveguide effective index range $\Delta N_{W0}$ within the tapered section, and wherein the optical fiber supports a fiber fundamental mode having a fiber effective index $N_{F0}$ that falls within the waveguide effective index range $\Delta N_{W0}$ at an axial position within the tapered section and
   transmitting the optical signal in one of the fiber fundamental mode and the waveguide fundamental mode to cause the evanescent optical coupling of the optical signal into the other of the waveguide fundamental mode and the fiber fundamental mode in the coupling region and at the axial position where the fiber effective index $N_F$ equals the waveguide fundamental mode effective index $N_{W0}$.

27. The method according to claim 26, further comprising configuring the tapered section to support optical transmission of the fundamental mode and up to six higher-order modes.

28. The method according to claim 27, wherein the waveguide effective index range $\Delta N_{W0}$ has a maximum span of 0.005.

29. The method according to claim 26, wherein the optical fiber comprises a glass inner cladding with a flat surface that resides at the coupling region.

30. The method according to claim 29, wherein the optical fiber comprises a glass core, a glass inner cladding and a polymeric outer cladding disposed about the glass inner cladding, and further comprising:
   stripping an end portion of the optical fiber of the polymeric outer cladding to expose the flat surface of the glass inner cladding.

31. The method according to claim 30, wherein the glass core of the optical fiber resides within a distance DS of the flat surface of the glass inner cladding, and wherein 0≤DS≤4 microns.

32. The method according to claim 26, wherein the coupling region has a coupling length LC in the range from 0.5 millimeters to 40 millimeters.

33. The method according to claim 26, wherein the glass substrate comprises between 3 mol % and 15 mol % of $Na_2O$.

34. The method according to claim 26, wherein the evanescent optical coupling has a coupling efficiency CE>80%.

35. The method according to claim 26, wherein the operating wavelength is in the range from 800 nanometers to 1600 nanometers.

36. The method according to claim 26, further comprising configuring the taper of the tapered section to have a constant width and to be defined by an axial variation in a refractive index of the tapered section.

37. The method according to claim 26, wherein the tapered section of the IOX waveguide supports optical transmission of only the waveguide fundamental mode and no higher-order modes.

38. The method according to claim 37, wherein the waveguide effective index range $\Delta N_{W0}$ has a maximum span of 0.003.

* * * * *